US009175798B1

(12) United States Patent
Thompson

(10) Patent No.: US 9,175,798 B1
(45) Date of Patent: Nov. 3, 2015

(54) TRENCHLESS REFURBISHMENT OF UNDERGROUND PIPES

(71) Applicant: Titan CMP Solutions LLC, Boise, ID (US)

(72) Inventor: Roger W. Thompson, Boise, ID (US)

(73) Assignee: Titan CMP Solutions LLC, Boise, ID (US)

( * ) Notice: Subject to any disclaimer, the term of this patent is extended or adjusted under 35 U.S.C. 154(b) by 0 days.

(21) Appl. No.: 14/732,565

(22) Filed: Jun. 5, 2015

Related U.S. Application Data

(60) Provisional application No. 62/008,119, filed on Jun. 5, 2014.

(51) Int. Cl.
*F16L 55/16* (2006.01)
*F16L 55/165* (2006.01)
(Continued)

(52) U.S. Cl.
CPC ........... *F16L 55/1658* (2013.01); *F16L 55/163* (2013.01); *F16L 55/1657* (2013.01); *F16L 55/18* (2013.01)

(58) Field of Classification Search
CPC ... F16L 55/1658; F16L 55/18; F16L 55/1657; F16L 55/163; F16L 55/165; F16L 1/26; B21D 41/02; B21D 41/026; B21D 41/028; B21D 39/08; B21D 26/033; E02F 5/18
See application file for complete search history.

(56) References Cited

U.S. PATENT DOCUMENTS 4,487,052 A    12/1984   Yarnell
4,678,370 A *   7/1987   Allen .......................... 405/184.2
4,848,964 A    7/1989   Yarnell
(Continued)

FOREIGN PATENT DOCUMENTS

EP    0647812 A1   4/1995
GB    2440626 A    2/2008
WO   00/37766      6/2000

OTHER PUBLICATIONS

Al-Abri, Omar S., et al., Structural behavior of solid expandable tubular undergoes radial expansion process—Analytical, numerical, and experimental approaches, International Journal of Solids and Structures, Sep. 2013, pp. 2980-2994, vol. 50, Issue 19.
(Continued)

*Primary Examiner* — Sean Andrish
*Assistant Examiner* — Carib Oquendo
(74) *Attorney, Agent, or Firm* — Zeman-Mullen & Ford, LLP

(57) ABSTRACT

A method for refurbishing an existing expandable host pipe. An expansion tool is adapted to generate isolated outward radial force when in expansion mode. The expansion tool is moved along a path inside the host pipe, stopping at stations on the way. At each station, responsive to isolated outward radial force from the expansion tool, the unobstructed interior diameter of the host pipe is increased via non-destructive plastic deformation of the interior wall. Once the entire host pipe is expanded in this fashion, a new rigid liner pipe is inserted inside the host pipe to operationally replace the host pipe. Grout is deployed in the annular space between liner pipe and host pipe. Expansion of the host pipe via non-destructive plastic deformation optimizes the refurbishment job and enables the original host pipe, as expanded, to contribute structurally to the refurbished pipe system.

13 Claims, 14 Drawing Sheets

(51) Int. Cl.
*F16L 55/18* (2006.01)
*F16L 55/163* (2006.01)

(56) References Cited

U.S. PATENT DOCUMENTS

| | | | |
|---|---|---|---|
| 4,930,542 A * | 6/1990 | Winkle et al. | 138/98 |
| 5,924,913 A | 7/1999 | Reimelt | |
| 6,167,913 B1 | 1/2001 | Wood et al. | |
| 6,457,532 B1 | 10/2002 | Simpson | |
| 7,096,570 B2 | 8/2006 | Marr et al. | |
| 7,191,841 B2 | 3/2007 | Sivley, IV | |
| 7,308,944 B2 | 12/2007 | Johnston et al. | |
| 7,559,365 B2 | 7/2009 | Watson et al. | |
| 7,559,722 B2 | 7/2009 | Crane | |
| 7,836,741 B2 | 11/2010 | Johnston | |

OTHER PUBLICATIONS

Camp, Craig, et al., Culvert Replacement Using Pipe Ramming, Tunneling, or Pipe Jacking, Paper for North American Society for Trenchless Technology (NASTT), No-Dig Show 2010, Paper A-5-05, pp. 1-11.

Brochure from the United States Department of Agriculture Forest Service, Decision Analysis Guide for Corrugated Metal Culvert Rehabilitation and Replacement Using Trenchless Technology, Dec. 2012.

Marr, Brian, Solid Expandable Casing Repair (Powerpoint Presentation), for SPE International (Society of Petroleum Engineers), Apr. 26, 2006.

Brochure prepared for the International Pipe Bursting Association, Guideline for Pipe Bursting, Jan. 2012.

Article from unitracc.com, Hydraulic and Static Pipe Bursting, 2014.

Weatherford Product Brochure, MetalSkin solid expandable systems, MetalSkin Cased-Hole Liner System, 2008.

Weatherford News Release, Weatherford Successfully Completes World's Longest ESS Installation in 6 Inch Horizontal Hole, Nov. 28, 2000.

Schladweiler, Jon C., From Orangeburg to Papier Mache Pipe—the Wood Fibre Pipes, the article was originally presented in the "Historian's Report" in the AWPCA (now the Arizona Water Association—AZ Water) Newsletter in Jul. 2005, but was found on the Internet at http://www.sewerhistory.org/articles/compon/orangeburg/pitch-fibre.pipe.htm.

https://www.youtube.com/watch?v=iiEeJ9fBHqc Trenchless pipe replacement with Grundoburst Tracto-Technik GmbH & Co. KG Uploaded Sep. 24, 2010.

https://www.youtube.com/watch?v=uVa_MVXpxxc Grundoburst hydraulic pipe splitting demo: Steel pipe TT Technologies channel Uploaded Sep. 4, 2013.

* cited by examiner

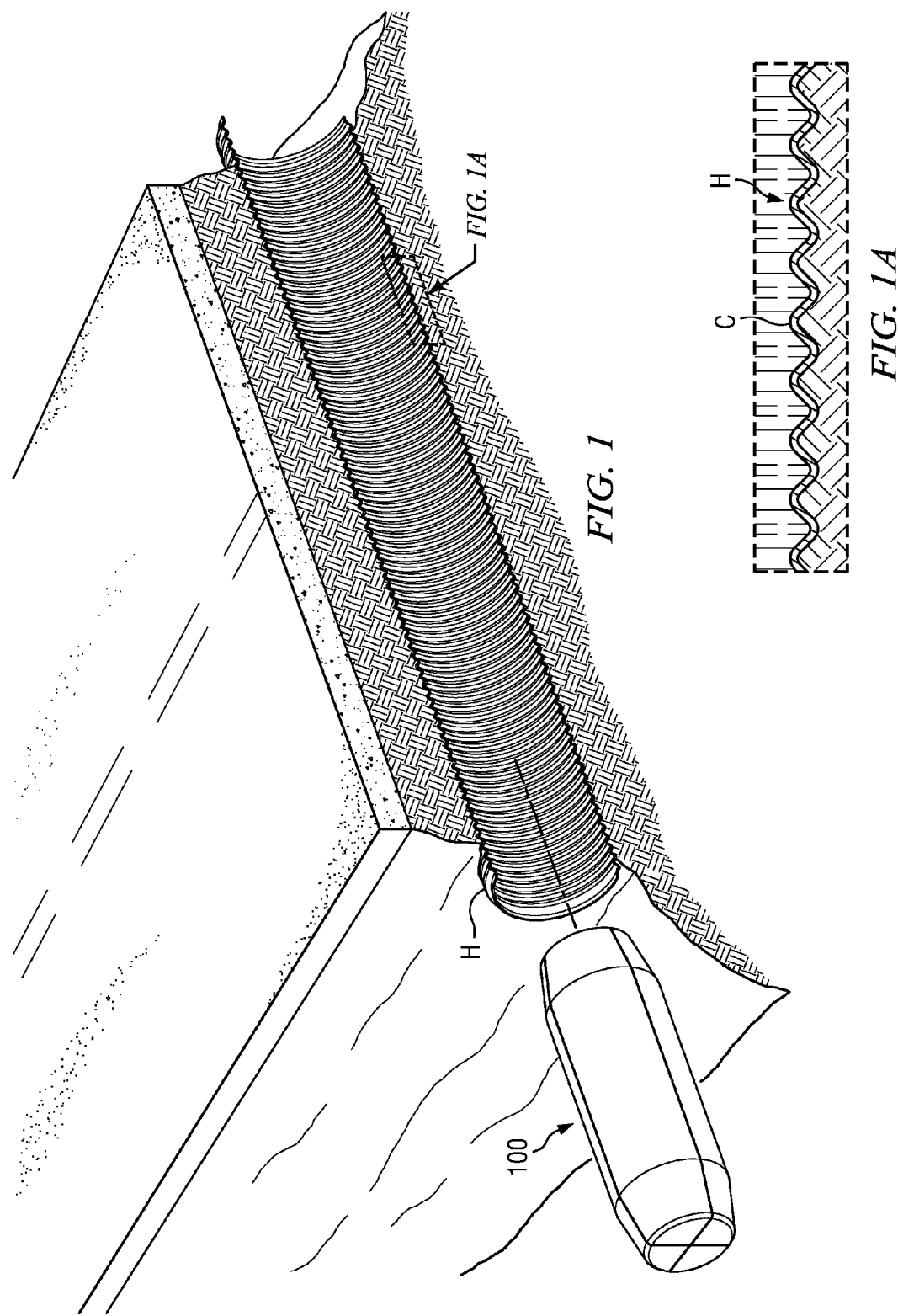

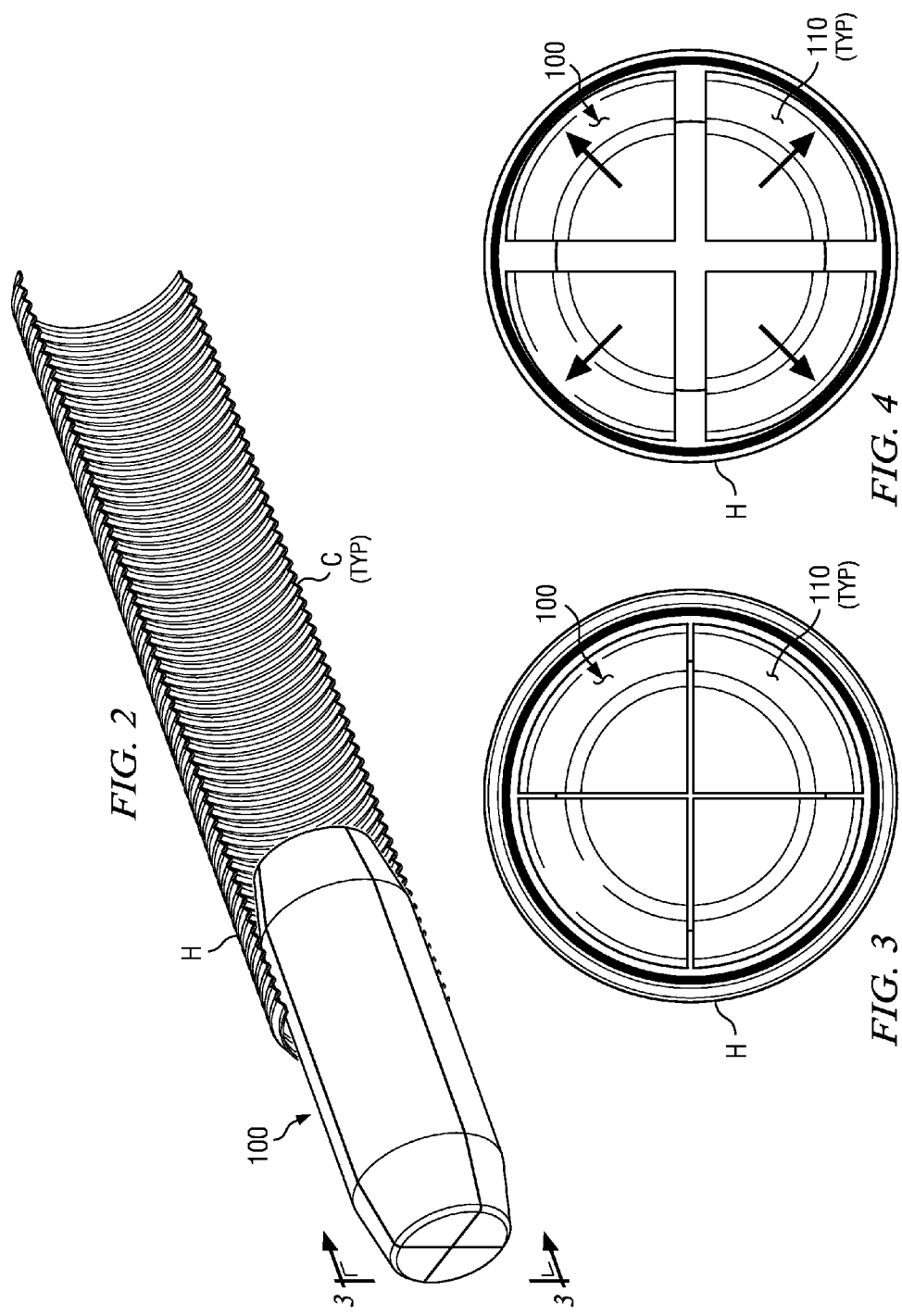

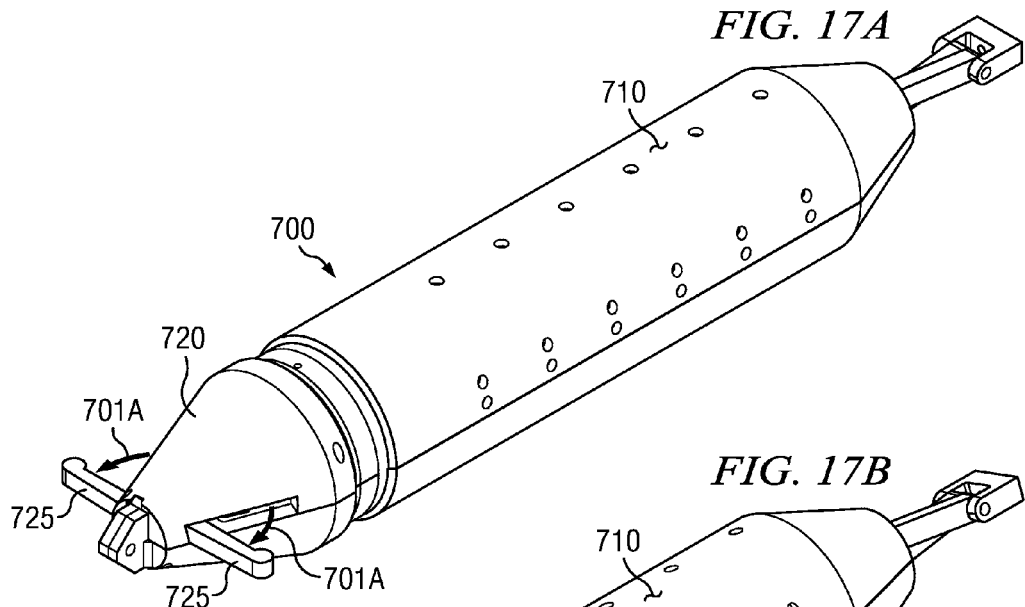
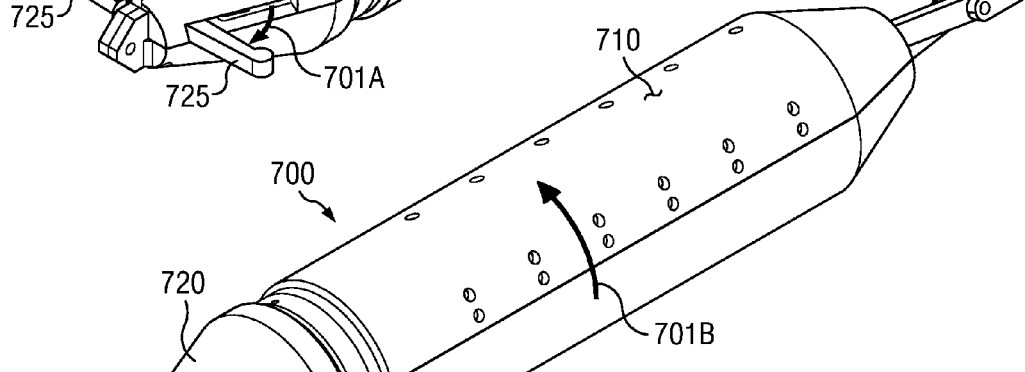
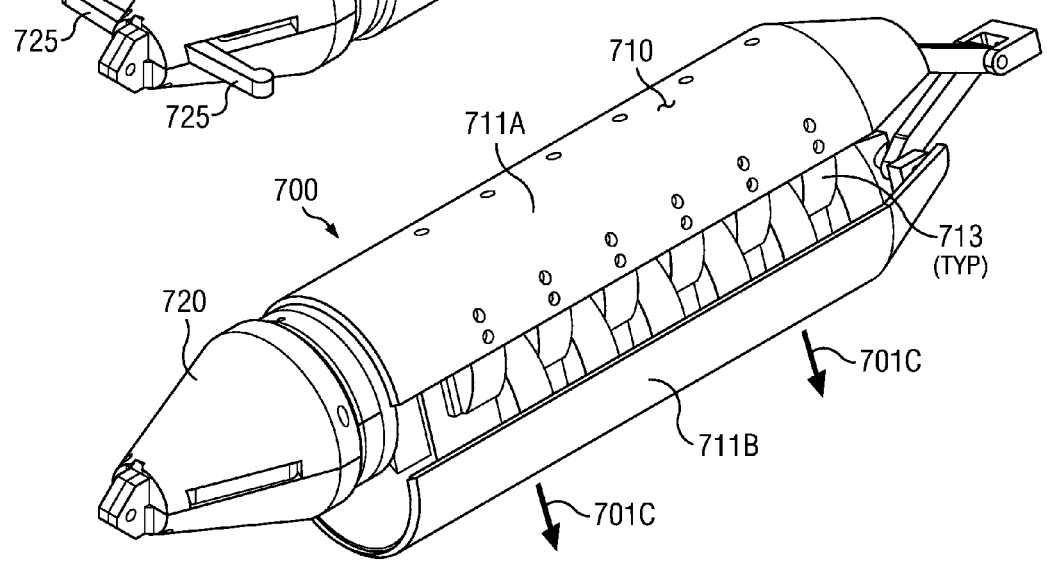

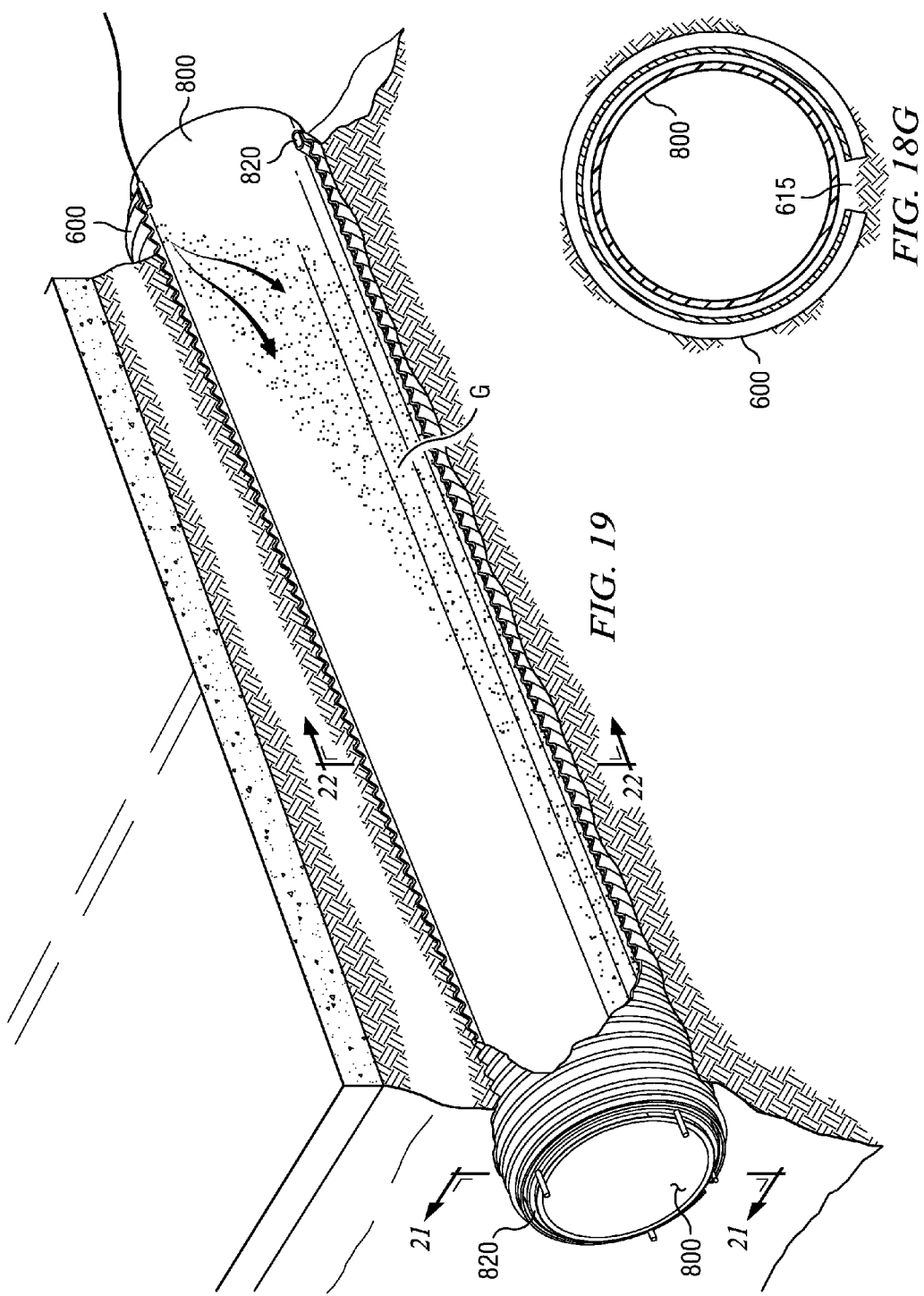

TRENCHLESS REFURBISHMENT OF UNDERGROUND PIPES

RELATED APPLICATIONS

This application claims the benefit of commonly-invented, commonly-assigned U.S. provisional patent application "TRENCHLESS METHOD FOR REFURBISHING EXPANDABLE PIPES", Ser. No. 62/008,119, filed Jun. 5, 2014, the disclosure of which provisional application is incorporated herein by reference.

FIELD OF THE DISCLOSURE

This disclosure is directed generally to methods for refurbishing buried expandable pipes without open cut replacement (i.e., without digging the pipe out of the ground). This disclosure is further directed to items of equipment that facilitate the disclosed refurbishment methods.

BACKGROUND

The term "expandable", as applied to an existing buried pipe or culvert, is used as a defined term of art throughout this disclosure. By "expandable", this disclosure refers to culverts and pipes having an existing wavy or folded annular or circumferential profile, such that, responsive to a controlled radial force, the "waves" or "folds" will collapse or "smooth out", allowing a limited expansion of the effective inside diameter of the pipe without intentionally rupturing the pipe. It is expected that many culverts or pipes falling within this definition will be metal, and will be corrugated or "accordion" in profile. However, the term is not limited to corrugated or accordion profiles on metal pipes or culverts.

Expandable culverts of interest in this disclosure primarily include buried pipes that carry, for example, water under roads and structures, usually to allow a stream to flow under a road or to carry runoff from the uphill side of a road to the downhill side. Utility piping and other infrastructure may also be carried within such culverts. Such culverts can be made from various materials, but are often made from corrugated metal because it provides flexibility and strength while remaining relatively light and inexpensive. Consequently, expandable metal pipe culverts have been widely used in road construction projects over the last 50 years.

The service life of an expandable metal culvert varies, depending on factors such as climate, maintenance, water flow, and the condition of the surrounding soil. However, this type of culvert came into widespread use in the 1950s, and many are now reaching the end of their useful life and need to be repaired or replaced (or refurbished) before they fail. Expandable metal culverts can fail in different ways. For example, rust and corrosion can cause the pipe to leak, or even to disintegrate and collapse. Leaks can lead to erosion around the pipe and the resulting lack of structural support can cause the pipe to break. Pipe failure can wash out roads and bridges and cause environmental damage to the waterways they drain into.

Culverts can be repaired, or refurbished, by building a new culvert or digging the existing pipe up and replacing it ("open cut" methods). But these methods can be costly and time-consuming. Further, open cut methods may impractical because of traffic volume (the road will likely have to be closed during open cut operations), terrain, or climate. However, culverts can sometimes be refurbished without digging them up. This process is referred to in the industry as trenchless replacement technology. In this method, a new pipe is attached to a tool that is pushed or pulled through the existing damaged pipe. The tool head intentionally breaks or splits the old pipe as it drags the new liner pipe in behind it (this technique is also called "pipe bursting"). These methods allow culverts to be replaced with minimal disruption to traffic flow on any roadway above the culvert and with less impact on the waterway the culvert drains into. However, it should be noted that such "pipe bursting" techniques are "destructive" to the host pipe (i.e., the old pipe being replaced), rendering the host pipe effectively useless to provide support or peripheral protection, for example, to a new liner pipe.

One example of the destructive "pipe bursting" technology in use today is disclosed in Unitracc publication "Hydraulic and Static Pipe Bursting", Feb. 16, 2011, available as of the date of this disclosure at: http://www.unitracc.com/know-how/fachbuecher/rehabilitation-and-maintenance-of-drains-and-sewers/rehabilitation/replacement-en/replacement-by-the-trenchless-method-en/unmanned-techniques-en/pipe-bursting-en/hydraulic-and-static-pipe-bursting-en.

According to this reference, a hydraulically expandable tool head shatters a surrounding existing brittle host pipe (typically clay or unreinforced concrete) as it is drawn down the length of the existing pipe. A replacement pipe follows close behind the tool head.

A further example of current trenchless technology is disclosed in U.S. Pat. No. 4,602,495 to Yarnell. Yarnell is a "non-destructive" alternative to destructive "pipe bursting" techniques such as disclosed in Unitracc, described above. Yarnell teaches an expandable tool head being drawn down an existing brittle host pipe in which "irregularities" have made it difficult, for example, to draw a new liner pipe through the pipe. Such "irregularities" include neighboring sections of existing pipe becoming misaligned and no longer coaxial, or soil pressure causing sections of the brittle pipe to fracture and partially collapse, constricting the original inner diameter of the pipe. A conical nose and expandable "leaf members" on the tool head temporarily remediate the "irregularities", primarily by pushing the broken host pipe back against soil pressure, so that the effective original internal diameter of the host pipe can be temporarily restored. At that point, an inner liner pipe can be drawn through.

Current destructive trenchless methods for replacing or refurbishing culverts are inadequate for some kinds of host pipes. Existing cutting and bursting techniques have had limited success on host pipes made from expandable materials such as corrugated metal. The principle upon which current technology "bursts" pipe requires a conical front end of the tool head (or "cutting head") to be dragged through the existing pipe, forcing the pipe over the body of the cutting head until it fractures or "bursts". The outside diameter of the body of the cutting head is thus chosen to be larger than the inside diameter of the pipe, causing the pipe to rupture as the cutting head is dragged through. There is thus a force placed on the existing pipe by the cutting head that has both longitudinal and radial components. Problems arise when this technique is used on flexible and expandable pipes such as corrugated pipes. Rather than bursting or splitting corrugated pipes, conventional techniques often compress the pipe longitudinally, which can cause the pipe to fold up in front of the tool like an accordion. Not only does this accordion effect make the overall pipe replacement process slower and more expensive, it can potentially cause the tool to get stuck in the old pipe or block the path for the new pipe. An existing expandable pipe may become so badly "accordioned" that a section may require spot digging and removal in order to complete the overall replacement job.

Further, non-destructive pipe replacement techniques in the prior art (such as the Yarnell disclosure, described above) have been directed to temporarily restoring an ailing host pipe to as close its original condition as possible, so that an inner liner pipe can be installed. Because the host pipe is temporarily restored to its original condition (or close to original), the thickness of the liner pipe, once installed, inevitably reduces the operational diameter of the repaired pipe. In applications where pipe flow or capacity is important, such operational diameter reduction can become disadvantageous.

SUMMARY OF DISCLOSED TECHNOLOGY AND TECHNICAL ADVANTAGES

The tools and processes described in this disclosure address the problems set forth in the "Background" section above, and other problems in the prior art. The described methods reject the prior art notion of relying on a pulling force to split the host pipe in destructive mode. In a first embodiment, a first refurbishment method utilizes a cylindrical hydraulic tool that expands and contracts in non-destructive mode. The tool is inserted into the host pipe via tensioned cables and hydraulically powered segments or stabilizers on the outside surface of the tool expand outward in a radial direction. In some variations of the first embodiment, the expansion tool may be functionally not dissimilar from the tool disclosed in Yarnell. In other variations, the expansion tool may be in accordance with a new design as disclosed herein with reference to FIGS. 17A through 17D and associated text.

The first refurbishment method is deployed on expandable host pipes such as corrugated host pipes. The expansion of the tool imparts radial force only against the inside surface of the host pipe, perpendicular to its longitudinal axis. The goal of the expansion step is to "smooth out" the "waves" in the periphery of the host pipe via radial force, without intentionally rupturing the host pipe. It is understood that in places, the wall of the host pipe may break unintentionally, especially where the host pipe is corroded or cracked. However, because the applied radial force is perpendicular to the pipe wall, it does not fold or bunch the host pipe. Further, with careful application of the first refurbishment method, such ruptured zones of host pipe should be limited. The structural integrity of the expandable host pipe is thus substantially preserved wherever possible, allowing the host pipe to provide support or an external layer of protection, for example, to the inner liner pipe when it is installed.

In a second embodiment, a second refurbishment method includes a designated cutting step to cut the host pipe longitudinally, in situ, along its entire length, prior to expansion. In this second embodiment, the expansion of the host pipe enlarges the host pipe's diameter by separation of the host pipe material either side of the cut line, rather than "smoothing out" the "waves" in the periphery of the host pipe (per the first refurbishment method). Advantageously the host pipe cut line is at the low point ("invert" or nadir) of the pipe, although this disclosure is not limited in this regard. Examples of situations when the second refurbishment method (longitudinal cut line) might be selected over the first refurbishment method (smoothing out waves) include: (1) when the host pipe is particularly corroded and brittle, and less susceptible to consistent plastic radial deformation of the periphery waves; (2) when the wall of the host pipe is particularly thick, or has been constructed with a number of overlapping metal joints, again making it difficult to obtain consistent plastic radial deformation of the periphery waves. It will be nonetheless appreciated that in accordance with the second refurbishment method (longitudinal cut line), as with the first refurbishment method (smoothing out waves), the structural integrity of the host pipe is thus substantially preserved wherever possible, allowing the host pipe to provide support for, or an external layer of protection to, the inner liner pipe when it is installed. In this way, expansion of the host pipe via non-destructive plastic deformation optimizes the refurbishment job and enables the original host pipe, as expanded, to contribute structurally to the refurbished pipe system.

Regardless of whether the first refurbishment method (smoothing out waves) or the second refurbishment method (longitudinal cut line) is selected, the host pipe is expanded section by section, each section being approximately the same length of the tool. Presently preferred embodiments of the tool may be 4-6 feet in length, although this disclosure is not limited in this regard. Once a section of host pipe is expanded, the expandable members on the tool are fully retracted. The tool is then advanced further into the host pipe and the next section is expanded. Once the host pipe is completely expanded, the new liner pipe can be installed via conventional methods, such as sliplining. The new liner pipe has a rigid tubular profile prior to installation and is deployed to operationally replace the host pipe.

Once the new liner pipe is installed, it is then stabilized in preparation for grouting the annular space between the host pipe and the liner pipe. The inner liner pipe may be stabilized, for example, by filling it with a fluid (such as water), or alternatively pressurizing it internally. Once the inner liner pipe is stabilized, grout or a similar material is injected under pressure into the annular space between the host pipe and the new liner pipe. The purpose of stabilizing the inner liner pipe is to give the inner liner pipe strength against deformation or collapse while the grout is being injected around it in liquid form. Once the grout has cured, inner liner pipe stabilization measures can be removed (e.g. via emptying the fluid or de-pressurizing the pipe). It should be noted that in the embodiments illustrated and described below, the annular space is filled with grout as much as possible, and advantageously completely filled. However, in other embodiments (not illustrated or described below) the annular space is at least partially filled with grout.

Some variations of the grouting phase (according to either the first or second refurbishment methods) deploy inflatable bulkheads at each end of the annular space between the host pipe and the liner pipe. An example of such an inflatable bulkhead is disclosed below with reference to FIGS. 20-21 and associated text. Once inflated, the bulkheads temporarily seal the annular space at either end, (1) allowing the annular space to be filled efficiently and cleanly with grout, and (2) holding the grout in place at the ends while it cures. Structure in at least one bulkhead includes a grout hose fitting that passes through the inflated chamber of the bulkhead, allowing grout to be injected into the annular space while the bulkhead is inflated.

In some situations in the first refurbishment method (smoothing out waves), an additional step of cutting a section of the host pipe may be required prior to expanding and plastically deforming the waves in the periphery of the pipe. As already noted, in some situations the host pipe may have become corroded, especially near the bottom (or "invert") if the pipe has been exposed to standing water for long periods. Such corroded portions of the host pipe are inelastic and likely to crack or shatter when expanded. A controlled cut of the host pipe prior to expansion facilitates proper execution of the expansion step in such corroded portions.

In other situations, characteristics of the host pipe itself may require that an additional step of cutting the host pipe may be advantageous prior to expanding the host pipe. For example, a common process for manufacturing corrugated host pipes involves helically rolling a continuous length of metal and forming it into a pipe with a spiral seam. Such spiral seams may be welded, riveted, or otherwise formed into an inelastic helical pathway along the finished host pipe. Applying expansion forces to these inelastic seams may cause the pipe to crack or burst at the seam. Alternatively the seams may be so strong that they resist and defeat the expansion step in the host pipe areas surrounding the seam. In such cases, similar to the situations described above with respect to corroded host pipe, a controlled cut of the host pipe prior to expansion facilitates proper execution of the expansion step.

Adding a cutting step prior to expansion of the host pipe may also be advantageous at the joints between lengths of host pipe as found in situ. When originally laid, lengths of host pipe may be joined by any conventional method, such as riveting, welding, or bolting together. Lengths of host pipe may have been "folded over" at the ends during installation, to facilitate engagement between neighboring lengths during the joining process. Alternatively, special "joint pieces" may have been used, in which a short piece of oversized host pipe is deployed over both ends of the host pipe pieces to be joined. The joint piece is then tightened down around both ends of the host pipe via band-type threaded fasteners. As a result, joints between lengths of host pipe in situ may present double or more the wall thickness, as well as further inelasticity due to the specific type of joining process originally used. As before, applying expansion forces to these inelastic joints may cause the host pipe to crack or burst at the joint. Alternatively the joints may be so strong that they resist and defeat the expansion step in the host pipe areas surrounding the joint. In such cases, similar to the situations described above with respect to corroded host pipe or a helical seam, a controlled cut of the host pipe prior to expansion facilitates proper execution of the expansion step.

According to a first embodiment, therefore, this disclosure describes a method for refurbishing an existing expandable pipe, the method comprising the steps of, in sequence: (a) providing an existing expandable host pipe, the host pipe having an expandable interior wall with a known unobstructed internal diameter; (b) providing an expansion tool having expansion and retraction modes, the expansion tool adapted to generate isolated outward radial force when in expansion mode; (c) moving the expansion tool along a path inside the host pipe, the path having stations at which the expansion tool stops; (d) expanding the host pipe during step (c), step (d) further including, at each station: (d1) stopping the expansion tool; (d2) placing the expansion tool in expansion mode; (d3) engaging the interior wall of the host pipe with the expansion tool while in expansion mode; (d4) responsive to isolated outward radial force from the expansion tool, increasing the unobstructed interior diameter of the host pipe a predetermined amount via non-destructive plastic deformation of the interior wall; (d5) switching the expansion tool to retraction mode; and (d6) moving the expansion tool to the next station; (e) withdrawing the expansion tool from the host pipe; (f) inserting a rigid liner pipe inside the host pipe, the liner pipe having a rigid tubular profile prior to insertion and deployed to operationally replace the host pipe, an annular space created between the liner pipe and host pipe when the liner pipe is inserted inside the host pipe; and (g) at least partially filling the annular space with grout.

According to a second embodiment, this disclosure describes a method for refurbishing an existing pipe, the method comprising the steps of, in sequence: (a) providing an existing host pipe, the host pipe having a length, the host pipe further having an interior wall with a known unobstructed internal diameter; (b) making a longitudinal cut through the interior wall along the length of the host pipe; (c) providing an expansion tool having expansion and retraction modes, the expansion tool adapted to generate isolated outward radial force when in expansion mode; (d) moving the expansion tool along a path inside the host pipe, the path having stations at which the expansion tool stops; (e) expanding the host pipe during step (d), step (e) further including, at each station: (e1) stopping the expansion tool; (e2) placing the expansion tool in expansion mode; (e3) engaging the interior wall of the host pipe with the expansion tool while in expansion mode; (e4) responsive to isolated outward radial force from the expansion tool, increasing the unobstructed interior diameter of the host pipe a predetermined amount via non-destructive plastic separation of the longitudinal cut through the interior wall; (e5) switching the expansion tool to retraction mode; and (e6) moving the expansion tool to the next station; (f), withdrawing the expansion tool from the host pipe; (g) inserting a rigid liner pipe inside the host pipe, the liner pipe having a rigid tubular profile prior to insertion and deployed to operationally replace the host pipe, an annular space created between the liner pipe and host pipe when the liner pipe is inserted inside the host pipe; and (h) at least partially filling the annular space with grout.

According to a third embodiment, this disclosure describes a method for refurbishing an existing pipe, the method comprising the steps of, in sequence: (a) providing an existing host pipe, the host pipe having a length, the host pipe further having an interior wall with a known unobstructed internal diameter; (b) making a longitudinal cut through the interior wall along the length of the host pipe; (c) providing a generally elongate cylindrical expansion tool, the expansion tool having an end assembly rotatably connected to an expansion assembly, the end assembly including at least two extendable radial stabilizers, the expansion assembly including a stationary radial force surface generally opposed to a floating radial force surface, the expansion assembly adapted to generate isolated outward radial force when actuated by displacing the floating radial force surface away from the stationary radial force surface; (d) moving the expansion tool along a path inside the host pipe, the path having stations at which the expansion tool stops; (e) expanding the host pipe during step (d), step (e) further including, at each station: (e1) stopping the expansion tool; (e2) extending the radial stabilizers to engage the interior wall of the host pipe and hold the end assembly rotationally immobile; (e3) actuating the expansion assembly until the stationary radial force surface and the floating radial force surface exert isolated outward radial force on opposing portions of the interior wall of the host pipe; (e4) responsive to step (e3), and locally at the stationary radial force surface and the floating radial force surface, increasing the unobstructed interior diameter of the host pipe a first predetermined amount via non-destructive plastic separation of the longitudinal cut through the interior wall; (e5) de-actuating the expansion assembly until at least one of the stationary radial force surface and the floating radial force surface disengages from the interior wall; (e6) rotating the expansion assembly a predetermined rotational displacement with respect to the end assembly; (e7) repeating steps (e3) through (e6) until the unobstructed interior diameter of the host pipe is increased overall at least a second predetermined amount via non-destructive plastic separation of the longitudinal cut through the interior wall; (e8) retracting the radial stabilizers until at least one of the radial stabilizers disengages from the interior wall of the host pipe; and (e9) moving the expansion tool to the next station; (f) withdrawing the expansion tool from the host pipe; (g) inserting a rigid liner pipe inside the host pipe, the liner pipe having a rigid tubular profile prior to insertion and deployed to operationally replace the host pipe, an annular space created between the liner pipe and host pipe when the liner pipe is inserted inside the host pipe; and (h) at least partially filling the annular space with grout.

The processes and tools described in this disclosure provide several advantages compared with conventional methods. First, as noted already, because the expansion forces are controlled and perpendicular to the host pipe wall, issues with the pipe folding up like an accordion are obviated. The disclosed processes are further non-destructive and preserves wherever possible the integrity of the host pipe, so that the host pipe may continue to contribute to operational longevity once the pipe refurbishment job is finished.

The disclosed processes further expand the outside diameter of the host pipe (by removing the existing "waves" or "folds", or by separating the host pipe either side of a controlled cut), leaving the host pipe larger in diameter than before. Introducing the inner liner pipe may thus, in certain applications, preserve the operational diameter of the pipe once the refurbishment job is finished. This retention of operational diameter may be highly advantageous in applications where pipe flow or capacity is important.

Another advantage of the disclosed processes is that the host pipe is completely expanded before the inner liner pipe is introduced (by sliplining or other conventional methods). In the prior art, and particularly in pipe bursting techniques that are destructive to the host pipe, the inner liner pipe is generally inserted to follow right behind the bursting tool as the tool moves along the host pipe. Causing the inner liner pipe to follow right behind the bursting tool avoids premature collapse of the surrounding soil into the tunnel void created by the burst host pipe. However, coordination of deployment of the inner liner pipe right behind the pipe bursting can make the logistics of the job difficult. Further, should there be an unintended collapse of the surrounding soil before the inner liner pipe can provide support, the inner liner pipe can become stuck, putting success of the job in jeopardy.

By contrast, the new processes described in this disclosure fully expand the host pipe, and substantially retain the host pipe's structural integrity, before the inner liner pipe is introduced. Since the host pipe is completely ready to receive the inner liner pipe, and is still supporting the surrounding soil, the inner liner pipe can be deployed quickly and efficiently using conventional methods such as sliplining. The disclosed processes are thus predictive of a much higher job success rate. Moreover, unlike refurbishment methods of the prior art (such as pipe bursting), the new processes of this disclosure create an annular space in which grout can be deployed, further enhancing the strength, performance and longevity of the finished refurbishment job.

Another advantage of the disclosed processes (and particularly those embodiments including cutting steps), is that they may achieve better results when applied to host pipes manufactured with a spiral seam. As noted, this type of pipe is constructed from a coil of metal that is formed into a pipe with a helical seam. The edges of the seam may be folded together along the entire length of the pipe to create a rigid body that is typically stronger than pipes with a longitudinal seam, making conventional pipe bursting difficult. Because the expansion forces in the processes described in this disclosure are applied perpendicular to the host pipe wall, the spiral seam may unravel and elongate without the "accordion" effect mentioned above. Alternatively, in embodiments including cutting steps, longitudinal cuts on the spiral seam allow proper execution of the expansion step. Thus, the integrity of the host pipe and its contribution to supporting the new pipe are preserved, even in operations where the host pipe is manufactured with a spiral seam.

It will be understood that host pipe expansion via unraveling of a spiral seam (per the previous paragraph), or following controlled cutting of the host pipe (per earlier disclosure), may be in addition to "smoothing out" the waves or folds in a corrugated or other expandable host pipe. The radial force provided by the expansion tool will enable both operations, thus expanding the host pipe by (1) increasing the circumference of the host pipe by unraveling the spiral seam, and/or (2) increasing the circumference of the host pipe by separating the host pipe material either side of the cut in the host pipe, and/or (3) "smoothing out" the waves or folds in the host pipe.

The grout (or other material) injected into the annular space between the host pipe and new liner pipe provides additional advantages over conventional trenchless methods, which typically omit this step. First, it secures the new liner pipe in position so it does not move or settle. Next, the grout fills voids in the soil under the host pipe, reducing the likelihood of pipe deflections from differential settlement. The grout also fills voids in the soil above the host pipe, which reduces point loads and impacts caused if those voids collapse (which is a major source of operational deflection and collapse of culverts).

The foregoing has outlined rather broadly some of the features and technical advantages of the disclosed trenchless pipe refurbishment technology, in order that the detailed description that follows may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described and as set forth in the appended claims.

BRIEF DESCRIPTION OF THE DRAWINGS

For a more complete understanding of the embodiments described in this disclosure, and their advantages, reference is made to the following detailed description taken in conjunction with the accompanying drawings, in which:

FIGS. 1 through 12 are a "freeze frame" series of illustrations of operations in accordance with a first embodiment of the disclosed technology (the "first refurbishment method" as described in the "Summary" section above);

FIG. 1A is a section as shown on FIG. 1;

FIGS. 15, 16, 18A through 18G, 19 and 22 illustrate a "freeze frame" series of operations in accordance with a second embodiment of the disclosed technology (the "second refurbishment method" as described in the "Summary" section above);

FIGS. 17A through 17D illustrate features and aspects of one embodiment of expansion tool 700 that may be used generally for tubular expansion, including in association with either the "first refurbishment method" or the "second refurbishment method" also disclosed herein;

DETAILED DESCRIPTION

Figure 5:
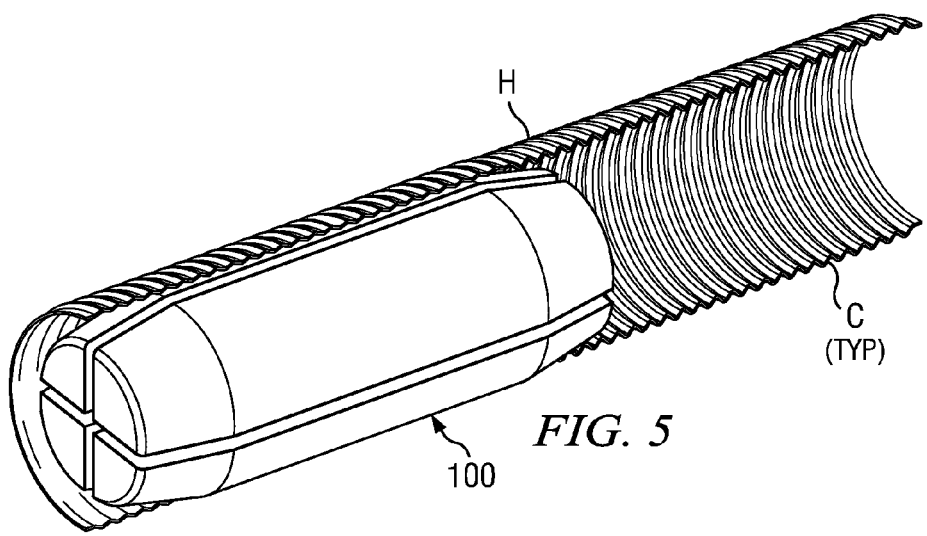

For the purposes of the immediately following disclosure, FIGS. 1, 1A, and 2 through 12 should be viewed together. Any part, item, or feature that is identified by part number on one of FIGS. 1, 1A, and 2 through 12 has the same part number when illustrated on another of FIGS. 1, 1A, and 2 through 12.

FIGS. 1 through 12 illustrate a "freeze frame" series of operations in accordance with a first embodiment of the disclosed technology (the "first refurbishment method" as described in the "Summary" section above). It will be recalled that the "first refurbishment method" expands the host pipe primarily by plastic, non-destructive deformation of the "waves" (typically corrugations) in the periphery of the host pipe.

FIGS. 1 through 10 depict expansion tool 100. It will be appreciated that expansion tool 100 is illustrated functionally and highly schematically on FIGS. 1 through 10. As shown (for example) on FIGS. 3 and 4, expansion tool 100 comprises expansion members 110. In the example illustrated, expansion tool 100 is an elongate, substantially cylindrical tool comprising four (4) longitudinal expansion members 110. Other embodiments of expansion tool 100 (not illustrated on FIGS. 1 through 10) may comprise a different number of expansion members 110, and this disclosure is not limited in this regard. Expansion tool 100 further comprises conventional structure (again not illustrated on FIGS. 1 through 10) for remotely extending and retracting expansion members 110 in a radial direction, perpendicular to the longitudinal axis of expansion tool 100. In preferred embodiments, conventional hydraulic actuating technology may be deployed to remotely extend or retract expansion members 110, but again this disclosure is not limited in this regard.

Referring momentarily to FIGS. 17A through 17D and associated text disclosure, an alternative embodiment of an expansion tool is illustrated that would also be suitable for expansion tool 100 as depicted on FIGS. 1 through 10. Although the expansion tool illustrated in FIGS. 17A through 17D is described in detail below with reference to a second embodiment of the disclosed technology (the "second refurbishment method" as described in the "Summary" section above), it will be understood that the expansion tool of FIGS. 17A through 17D is not limited to that second embodiment, and may be used in other embodiments, including the first embodiment as illustrated on FIGS. 1 through 10.

Returning now to FIGS. 1 through 12, existing host pipe H on is metal and has a wavy or corrugated profile, and falls within the definition of "expandable" pipe coined at the beginning of this disclosure. For purposes of easy reference, such definition is repeated here. By "expandable", this disclosure refers to culverts and pipes having an existing wavy or folded annular or circumferential profile, such that, responsive to a controlled radial force, the "waves" or "folds" will collapse or "smooth out", allowing a limited expansion of the effective inside diameter of the pipe without intentionally rupturing the pipe.

FIG. 1A is a section as shown on FIG. 1, and illustrates corrugations C on host pipe H. While currently preferred embodiments refer to host pipe H having corrugations C as shown on FIG. 1A, it will nonetheless be appreciated that this disclosure is not limited in this regard. It will be understood that the scope of this disclosure includes any "expandable" host pipe H, per the above definition.

In FIGS. 1 and 2, expansion tool 100 is approaching and entering host pipe H to begin expansion of corrugations C. It will be noted that, with further reference to FIG. 3, expansion members 110 are in a retracted state during longitudinal movement of expansion tool 100 through host pipe H. It will be further noted that at least one end (and on FIGS. 1 through 12, both ends) of expansion tool 100 is/are tapered. Such tapers are an optional but advantageous feature to assist with easy movement up and down host pipe H without catching or snaring on corrugations C. However, importantly, such tapers impart no longitudinal forces on corrugations C or host pipe H during longitudinal movement of expansion tool 100 within host pipe H. Expansion tool 100 imparts isolated outward radial force on host pipe H. This is in distinction to prior art tools and processes where dragging such tapers through constricted pipe openings caused bursting of the host pipes (usually brittle host pipes) via a combination of longitudinal force and radial force. As noted in the "Summary" section above, such longitudinal forces are disadvantageous in expandable pipe applications. As will be explained further, the tapered ends of expansion tool 100 as illustrated, for example, in FIG. 1, advantageously make no material contact with corrugations C while expansion tool 100 moves longitudinally through host pipe H with expansion members 110 in a retracted state. The tapered ends only make contact with corrugations C via radial force, while expansion tool 100 is stationary and with expansion members 110 in an extended state.

In FIG. 4, expansion tool 100 has reached a first station within host pipe H and is now stationary. Expansion members 110 are actuated to expand host pipe H, causing a limited and predetermined plastic deformation of corrugations C via radial force only. Advantageously, the predetermined deformation is sufficient to "flatten out" corrugations C without intentionally rupturing host pipe H. As noted above in the "Summary" section, some parts of host pipe H, especially along the lower surface, may be so corroded that the radial force applied by expansion members 110 may unintentionally rupture host pipe H. However, because the applied radial force is perpendicular to the longitudinal axis of host pipe H, it does not fold or bunch host pipe H. Further, with careful application of the method, such unintentionally ruptured zones of host pipe H should be limited.

Figure 6:
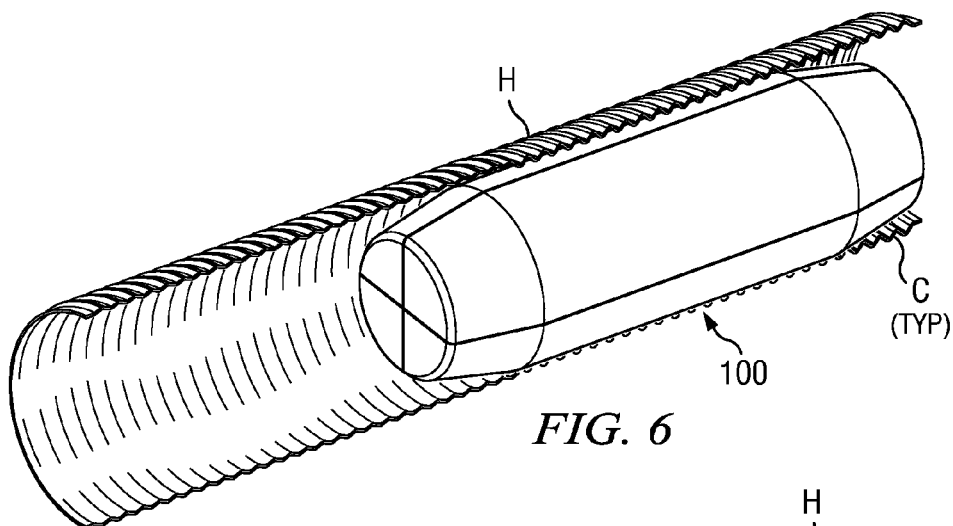

In FIG. 5, expansion members 110 are in the process of being retracted, and expansion tool 100 is being made ready to be moved on to its next station. In FIG. 6, expansion tool 100 has reached its next station and is stationary again. As noted earlier, the number of expansion members 110 provided on a particular expansion tool 100 may vary per user design choice. However, expansion members 110 advantageously do not operate independently. Rather, they extend and retract in unison, exerting uniform radial force around the circumference of host pipe H, which helps keep expansion tool 100 centered and balanced as it operates on host pipe H.

It will be seen in FIGS. 5 and 6 that the leading tapered end of expansion tool has imparted a radial force on corrugations C during the actuation of expansion members 110 while expansion tool 100 was stationary. However, it will be further seen and appreciated that as expansion tool 100 is moved on to its next station, with expansion members 110 in a retracted state, the tapered end makes no contact with corrugations C.

Figure 7:
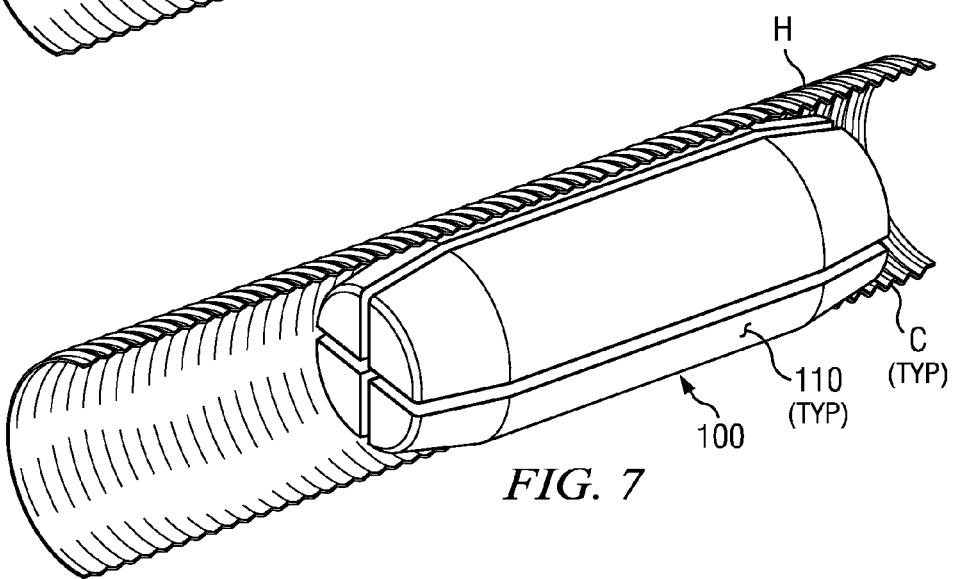
Figure 8:
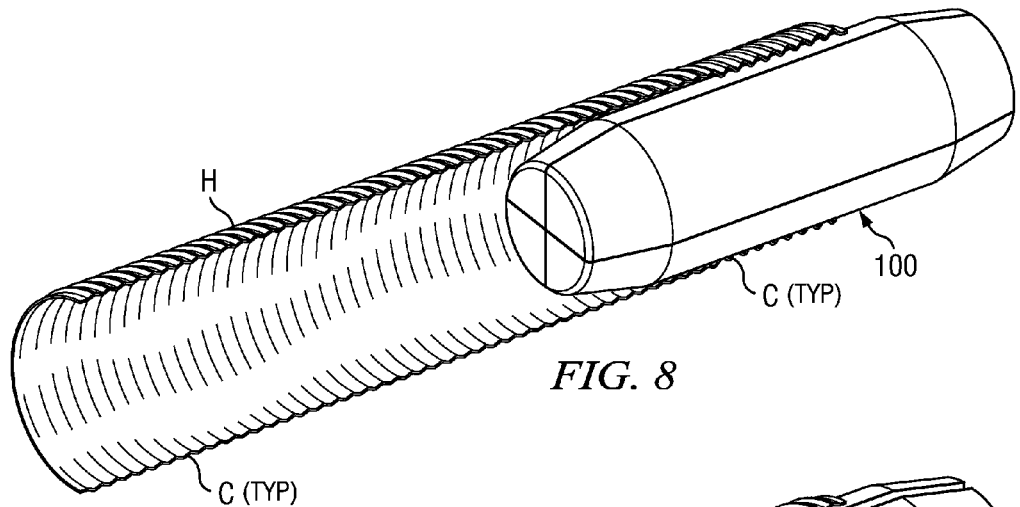
Figure 9:
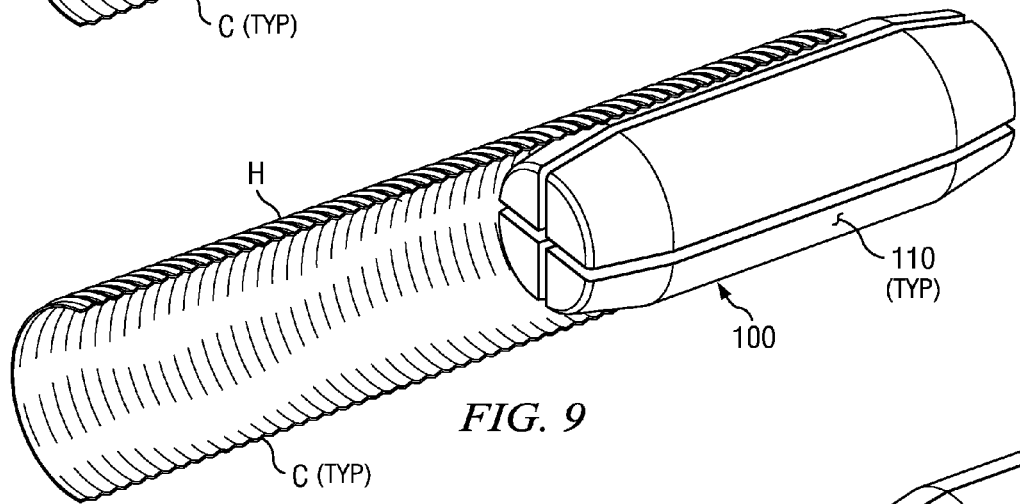
Figure 10:
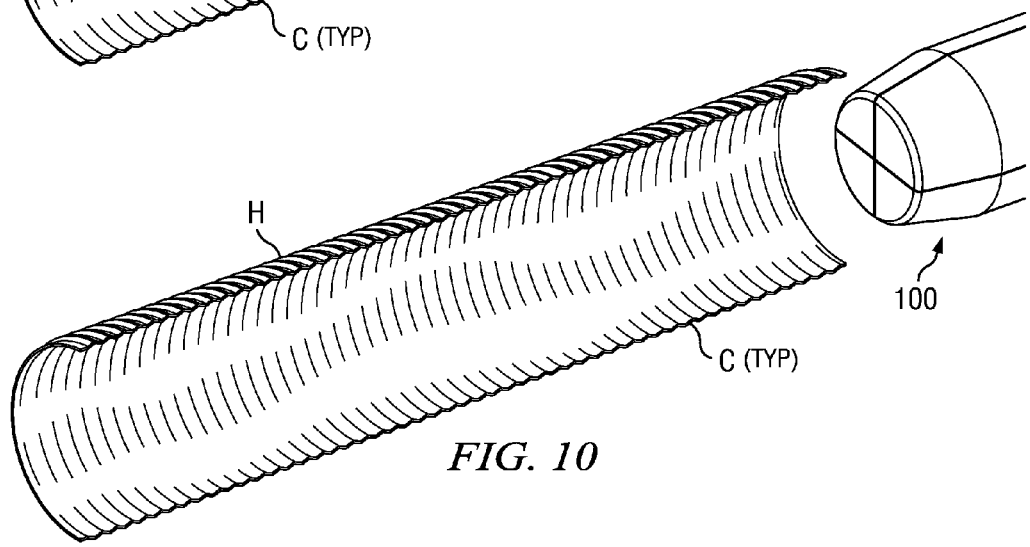

FIGS. 7 through 9 show the above-described process repeated through second and third stations, until, as shown on FIG. 10, expansion tool 100 has passed completely through host pipe H, leaving it temporarily in an expanded state. In FIG. 7, expansion members 110 are actuated, causing a causing a limited and predetermined deformation of corrugations C via radial force only. In FIG. 8, expansion members 110 have been retracted, whereupon expansion tool 100 has been moved longitudinally to a third station in host pipe H. Once stationary, expansion members 110 are extended and retracted again in FIG. 9 to cause a limited and predetermined plastic deformation of corrugations C via radial force only.

Figure 11:
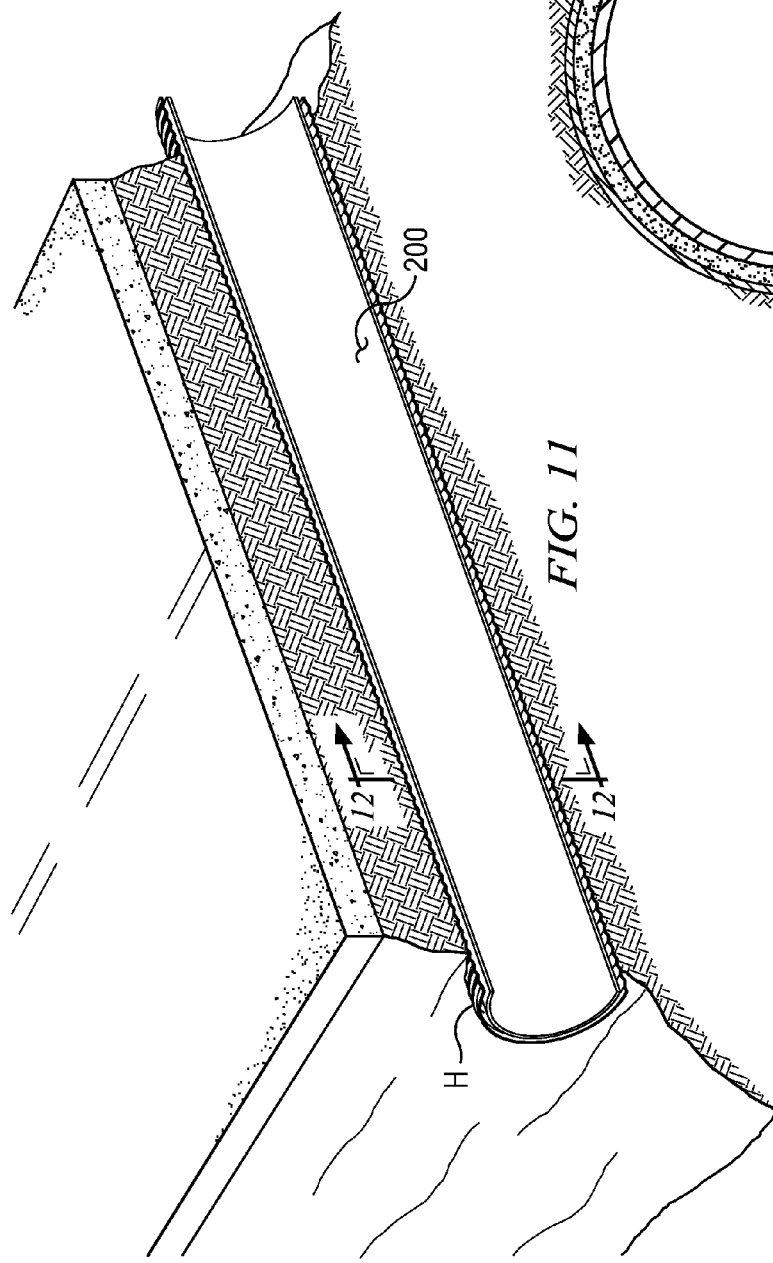

As shown on FIG. 11, an inner liner pipe 200 may now be deployed inside the expanded host pipe H. In currently preferred embodiments, and as illustrated on FIGS. 11 and 12, inner liner pipe has a smooth profile on both inner and outer surfaces, although this disclosure is not limited in this regard. Other embodiments may deploy a corrugated liner pipe 800 to give liner pipe additional intrinsic strength. Inner liner pipe 200 may typically be made of a light weight, hard wearing material, such as 16 to 20 gauge steel, or PVC, or a fiber-resin composite. It will be nonetheless appreciated that this disclosure is not limited to any specific material for inner liner pipe 200.

Figure 12:
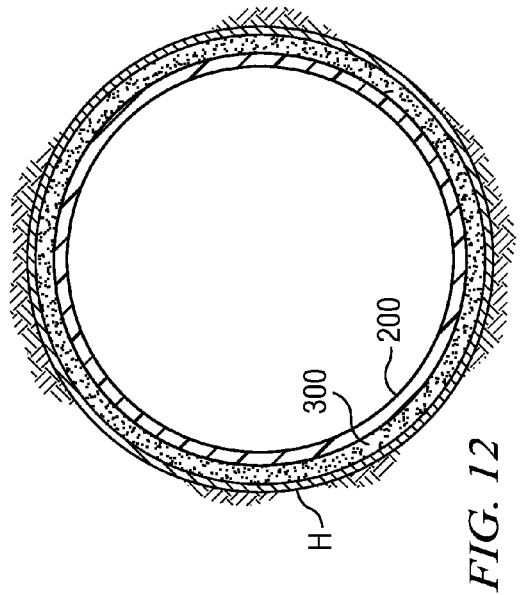

It will be further appreciated from FIGS. 11 and 12, that with host pipe H now in an expanded state, the outside diameter and wall thickness of inner liner pipe 200 may be selected to provide an inner diameter of inner liner pipe 200 that is comparable to the effective operating diameter of host pipe H before expansion. By "comparable", the inner diameter of inner liner pipe 200 may be selected to be at least as large as the effective operating diameter of host pipe H before expansion, if not larger. As noted in the "Summary" section of this disclosure above, this aspect of disclosure may be particularly advantageous in applications where the capacity of flow capability of host pipe H is desired to be maintained or even improved after refurbishment.

Also, as noted in the "Summary" section of this disclosure above, the introduction of inner liner pipe 200 only after host pipe H has been completely expanded greatly enhances the probability of the success of the job. This is in contrast to prior art processes where the inner liner pipe has to follow right after a host pipe bursting tool in order to avoid collapse of the surrounding soil into the host pipe void. Further, the introduction of inner liner pipe 200 only after host pipe H has been completely expanded allows the annular space between inner liner pipe 200 and host pipe H to be grouted.

FIG. 12 shows grout 300 deployed in the annular space between host pipe H and inner liner pipe 200. In the illustrated embodiment, grout 300 advantageously fills the annular space. In other embodiments, the annular space is at least partially filled with grout 300. When fully cured, grout 300 serves several purposes. In combination with host pipe H and inner liner pipe 200, grout 300 forms a "layered" refurbished pipe that is robust in and of itself, and which is also supported properly by the surrounding soil. Grout 300 also assists in minimizing leaks, both into inner liner pipe 200 from the surrounding soil, and vice versa. Grout 300 may also fill voids in the soil surrounding host pipe H.

Figure 13:
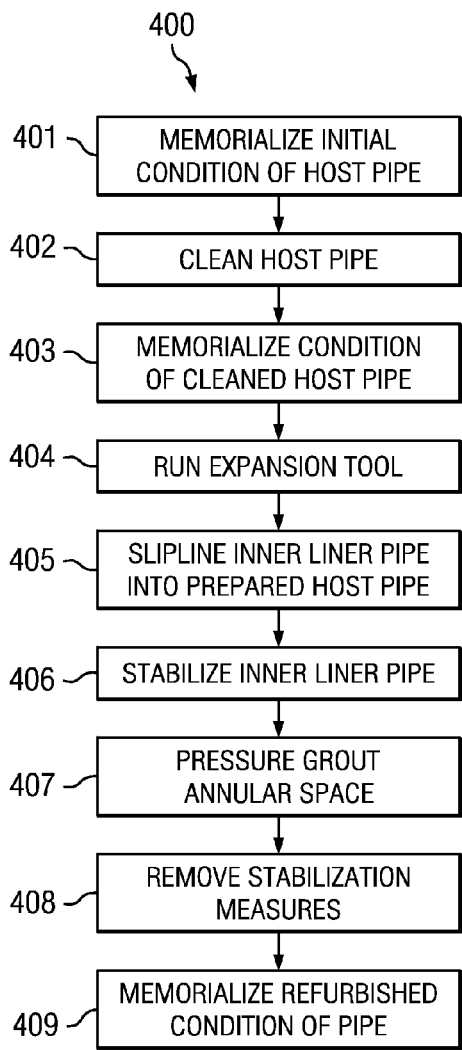
FIG. 13 is a flow chart illustrating a first embodiment of a method of refurbishing an underground pipe in accordance with the disclosed technology (the "first refurbishment method" as described in the "Summary" section above)

FIG. 13 is a flow chart illustrating a first embodiment of a method of refurbishing an underground pipe in accordance with the disclosed technology (the "first refurbishment method" as described in the "Summary" section above). The embodiments described above with reference to FIGS. 1 through 12 may be used in the method of FIG. 13. On FIG. 13, blocks 401 through 409 recite, in summary form, the steps of the method 400, which are described in greater detail in the written disclosure immediately below.

Block 401 on FIG. 13 refers to the step of memorializing the initial condition of the host pipe prior to beginning any refurbishment operations. While this may be accomplished by conventional image-capture methods such as video or still photography, this disclosure is not limited in this regard.

The next step is to clean the host pipe (block 402), if necessary. The host pipe often contains dirt and other organic matter in its native state before refurbishment begins. This cleaning step may be completed by any method suitable to the nature and condition of the particular host pipe and its surrounding geography. In some embodiments, the cleaning step may require the contents of the host pipe to be captured and removed from the site. When the cleaning is complete, the next step is to memorialize the condition of the cleaned host pipe (block 403), again via conventional methods.

Block 404 on FIG. 13 refers to the step of running a pipe expansion tool through the host pipe to expand the host pipe, consistent with the disclosure above accompanying FIGS. 1 through 12. In preferred embodiments, tensioned cables are connected to both ends of the pipe expansion tool, which enables the operator to move the expansion tool longitudinally in either direction inside the host pipe. The operator also controls conventional hydraulic extension and retraction of the expansion members on the expansion tool when the expansion tool is stationary at a preselected station inside the host pipe. Again, see disclosure above with reference to FIGS. 1 through 12.

In some applications (not illustrated), the host pipe may be made from shorter segments of expandable pipe that are joined by a band or sleeve that overlaps the joint where the segments abut. Occasionally, these joints may prove impractical to expand because of the additional strength the band provides at the joint. In these cases, the host pipe or the exterior band (or both) may need scored or cut prior to running the expansion tool through the host pipe. The scoring or cutting process can be completed via conventional techniques appropriate to the material and condition of the host pipe. This cutting step is described in greater detail below with reference to FIG. 14, and particularly with reference to block 504 on FIG. 14.

Continuing with FIG. 13, and consistent with the disclosure above accompanying FIGS. 1 through 12, the step of running the expansion tool (block 404 on FIG. 13) is accomplished by (a) moving the expansion tool longitudinally to a first station in the host pipe, (b) holding the expansion tool stationary while expanding the expansion members, (c) retracting the expansion members until the expansion tool is in a fully retracted state, (d) moving the expansion tool longitudinally to the next station, and (e) repeating substeps (b) through (d) until the host pipe is fully expanded. In this way, the entire length of the host pipe is expanded and prepared to receive the new inner liner pipe.

It may be advantageous in some cases to evaluate the condition of the expanded host pipe before inserting the new inner liner pipe, again via conventional image-capture techniques. Additionally, or alternatively, it may be desirable pass a mandrel, "drift", or similar inspection instrument through the fully expanded host pipe way to verify that it has been expanded to the desired diameter and roundness. Portions of the host pipe found to require further work may be selectively expanded again by moving the expansion tool into longitudinal position and actuating the expansion members.

Once the expansion operations referred to in block 404 are complete, the new inner liner pipe is inserted ("sliplined") into the expanded host pipe (block 405 on FIG. 13). This may be done via conventional methods suitable to the conditions of the particular project (e.g., the geography and soil type of the surrounding terrain, the type and size of the replacement pipe, and the coefficient of friction between the new pipe and the host pipe). Suitable "slipline" methods may include, for example, using a crane to place the inner liner pipe in position, in segments or in a single piece, and then pulling the inner liner pipe through the host pipe with cables and a winch. This disclosure is not limited to any user-selected method of inserting, or "sliplining" the inner liner pipe into place.

In many applications of expandable (and typically corrugated) host pipes, the expansion operation will typically increase the diameter of the host pipe by one to four inches. Thus, the new inner liner pipe can be selected to provide a comparable (i.e. the same or larger) inside diameter as the operational diameter of the original host pipe. The new inner liner pipe may be made from any material that meets the industry standards. In preferred embodiments, the new pipe is made from 16 to 20 gauge steel because it provides strength and fire-resistance while maintaining enough flexibility to negotiate any dimensional anomalies that remain in the host pipe after the expansion. Other inner liner pipes may be made, for example, from PVC or fiber-resin composites.

Next, the new inner liner pipe is stabilized in preparation for grouting the annular space between the host pipe and the new liner pipe (block 406 on FIG. 13). As mentioned above in the "Summary" section, such stabilization may be accomplished by, for example, filling the inner liner pipe with a fluid (such as water) or pressurizing the inner liner pipe. Pressurization may be done using any conventional techniques, such as temporarily sealing the ends of all or a segment of the inner liner pipe with collar gaskets before introducing fluid under pressure. The stabilization step protects the new inner liner pipe during the subsequent grouting process (block 407) where the weight of the uncured grout could cause an unpressurized inner liner pipe to buckle or deform. In presently preferred embodiments, the pressurizing fluid is air or water, but this disclosure is not limited in this regard.

In other embodiments (not illustrated), particularly where pressurization of the inner liner pipe may be impractical or unsuitable, inner liner pipe may be filled with a liquid instead, such as water. Similar to pressurization, filling the inner liner pipe with liquid protects the new inner liner pipe during the subsequent grouting process (block 407) where the weight of the uncured grout could cause an otherwise empty inner liner pipe to buckle or deform.

Block 407 on FIG. 13, as noted above, refers to the step of filling the annular space between the host pipe and the new inner liner pipe (while stabilized) with grout. Preferably, the grout fills the annular space, but in some embodiments the annular space is at least partially filled with grout. This is done via any conventional technique, such as pressure-injecting a conventional cement grout, or by injection of a hydrophilic resin and water. Such hydrophilic resins have a strong affinity for water, and expand on contact with water. When cured, the resin becomes an effective grout.

A common failure in conventional sliplining operations is caused by voids left surrounding the exterior of the inner liner pipe. Voids below the liner pipe reduce structural support for the pipe which may cause the pipe to buckle under its own weight. Additionally, voids above the pipe may collapse and create a point load on the pipe, which can deform or break the pipe. Pressurized grout fills not only the space between the host pipe and the new inner liner pipe, but can also help fill voids in the soil around the exterior of the host pipe and thereby reduce the frequency of those failures.

Returning to FIG. 13, block 408 refers to the step of removing the stabilization measures from the inner liner pipe. Typically this will involve draining the inner liner pipe of fluid (fill liquid or pressure fluid) after the grout has cured. Block 409 refers to the step of memorializing the condition of the new refurbished pipe after the inner liner pipe has been deployed and the annular space has been filled with grout. Again, conventional methods appropriate to the nature of the projects may be used to perform this step. In some cases, it may be necessary to have an inspection performed by the proper regulatory authority.

Figure 14:
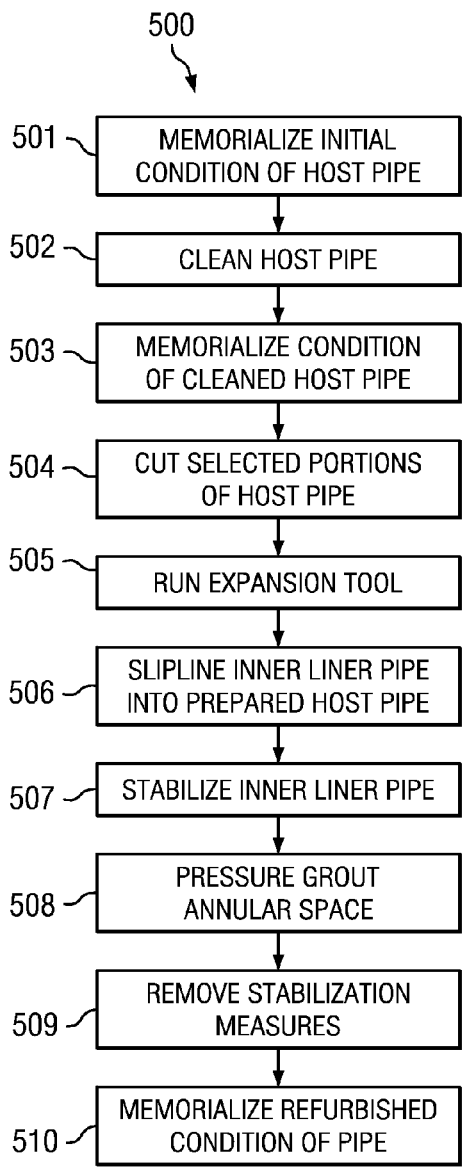
FIG. 14 is a flow chart illustrating a variation of the method of FIG. 13, adding a cutting step.

FIG. 14 is a flow chart illustrating a variation of the method of FIG. 13, adding a cutting step. As such, FIG. 14 depicts a variation of the "first refurbishment method" as originally described in the "Summary" section above. The embodiments described above with reference to FIGS. 1 through 12 may be used in the method of FIG. 14. On FIG. 14, blocks 501 through 510 recite, in summary form, the steps of the method 500, which, with the exception of block 504, are described in greater detail in the written disclosure immediately above with further reference to the corresponding steps in method 400, depicted on FIG. 13.

Comparison of FIGS. 13 and 14 will show that the primary difference is the addition of block 504 in method 500 on FIG. 14, in which selected portions of the host pipe may be cut prior to the step of running the expansion tool. Apart from the disclosure associated with block 504 (which follows immediately below), all of the disclosure above associated with method 400 on FIG. 13 applies in all respects to the corresponding steps in method 500 on FIG. 14. As noted, the following disclosure focuses on block 504 on FIG. 14.

Block 504 on FIG. 14 refers, as noted, to the step of cutting selected portions of the host pipe prior to the step of running the expansion tool (block 505). As discussed above in the "Summary" section of this disclosure, situations may arise during refurbishment operations in which it may be advantageous to make such cuts in the host pipe prior to expansion. Such situations include, for example, (1) when the host pipe is corroded at its invert, or (2) when the host pipe includes a helical seam, such as a spiral lock seam, or (3) at host pipe joints, where lengths of host pipe were spliced together end-to-end when the host pipe was originally laid in situ. In such situations, the host pipe may be relatively inelastic in the areas around the anomaly, as compared with areas away from the anomaly. Applying expansion pressure on such inelastic zones may cause undesirable effects, such as the host pipe bursting or cracking around the anomaly. Alternatively, in such situations, the host pipe may be disproportionately stronger than in the areas around the anomaly, and thus disproportionately resistant to expansion. The anomaly thus tends to constrain the expansion tool from delivering its planned amount of deflection of the host pipe in order to accommodate the inner liner pipe when deployed later. Overall, any one of a number of adverse effects may result. For example, (1) cracked or burst host pipe may not be able to function properly as a support around the inner liner pipe, and/or (2) an unexpanded section of host pipe may obstruct the inner liner pipe from being sliplined in, and/or (3) an unexpanded section of host pipe may cause the inner liner pipe to get stuck during sliplining operations, and/or (4) an unexpanded section of host pipe may obstruct proper distribution of grout between host pipe and inner liner pipe.

In situations where the locations of corroded or disproportionately strong host pipe are known and can be anticipated, it may be advantageous to preemptively cut the host pipe through the anomaly prior to expansion. This may be done using any conventional cutting apparatus, such as a remotely controlled cutting buggy running along a track disposed in the bottom (invert) of the host pipe. The cutting buggy may provide rotary cutting wheels, for example, to make the cuts through the wall of the host pipe. In other applications, the cutting buggy may provide other cutting apparatus, such as oxycetaline cutting or electric arc gouging/cutting. This disclosure is not limited to any particular cutting apparatus used to perform the cutting step in block 504 on FIG. 14.

It will be appreciated that according to the "first refurbishment method" (smoothing out waves) originally described in the "Summary" section above, the host pipe will expand differently during pipe expansion, per block 505 on FIG. 14, in areas where the host pipe has been cut, per block 504 on FIG. 14. Per earlier disclosure associated with FIGS. 1 through 12, host pipe expansion exerts radial forces on the host pipe. In areas where the host pipe has not been cut, the radial forces flatten the corrugations on the host pipe, and cause circumferential deflection of the host pipe, leaving a host pipe of larger effective internal diameter after expansion. In contrast, in areas where the host pipe has been cut, the radial forces will also cause the host pipe to "open up" where it has been cut, via bending at the circumferential point opposite the cut. Such "opening up", assuming the associated bending deflection of the host pipe is plastic, will have the same overall effect of leaving a host pipe of larger effective internal diameter after expansion.

To avoid doubt, while currently preferred embodiments throughout this disclosure so far, have referred to corrugated culverts and pipes as the host pipe, it will be appreciated that the inventive aspects of this disclosure are not limited in this regard. It will be understood that the methods and tools of this disclosure in accordance with the "first refurbishment method" (smoothing out waves) are operable on any expandable host pipe falling within definition of "expandable" as set forth earlier, namely culverts and pipes having an existing wavy or folded annular or circumferential profile, such that, responsive to a controlled radial force, the "waves" or "folds" will collapse or "smooth out", allowing a limited expansion of the effective inside diameter of the pipe without intentionally rupturing the pipe.

Figure 20:
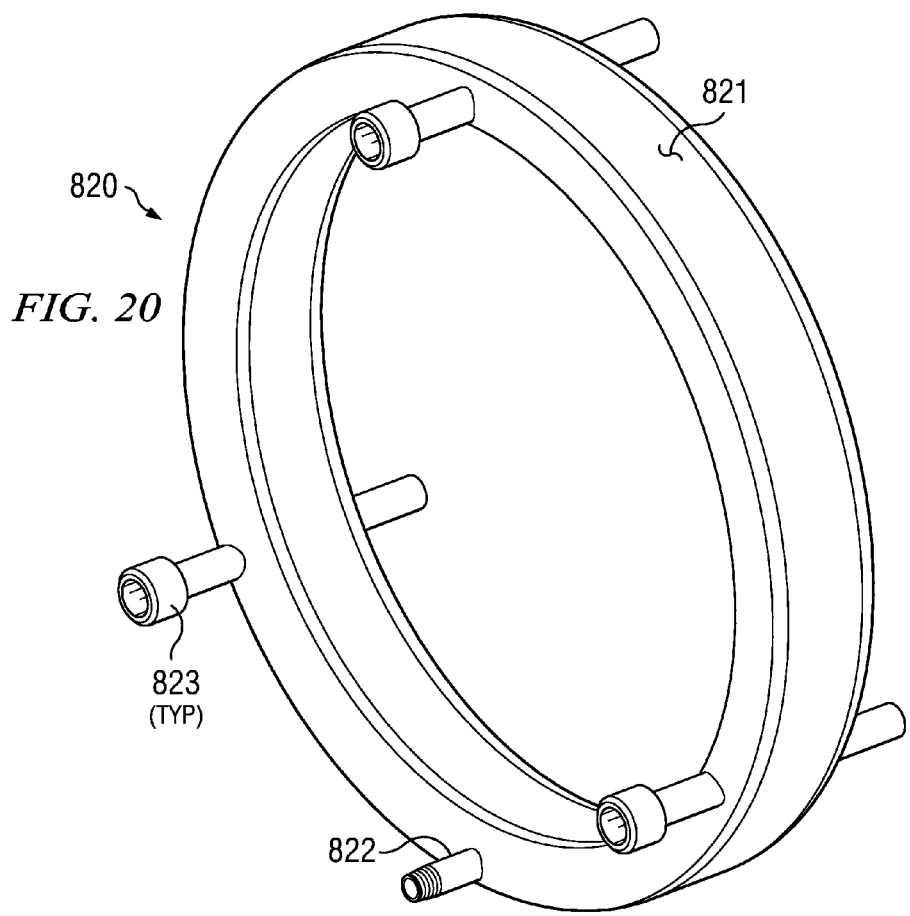
FIGS. 20 and 21 illustrate features and aspects of inflatable bulkhead 820 that may be used generally for sealing annular spaces to be grouted, including in association with either the "first refurbishment method" or the "second refurbishment method" also disclosed herein.
Figure 21:
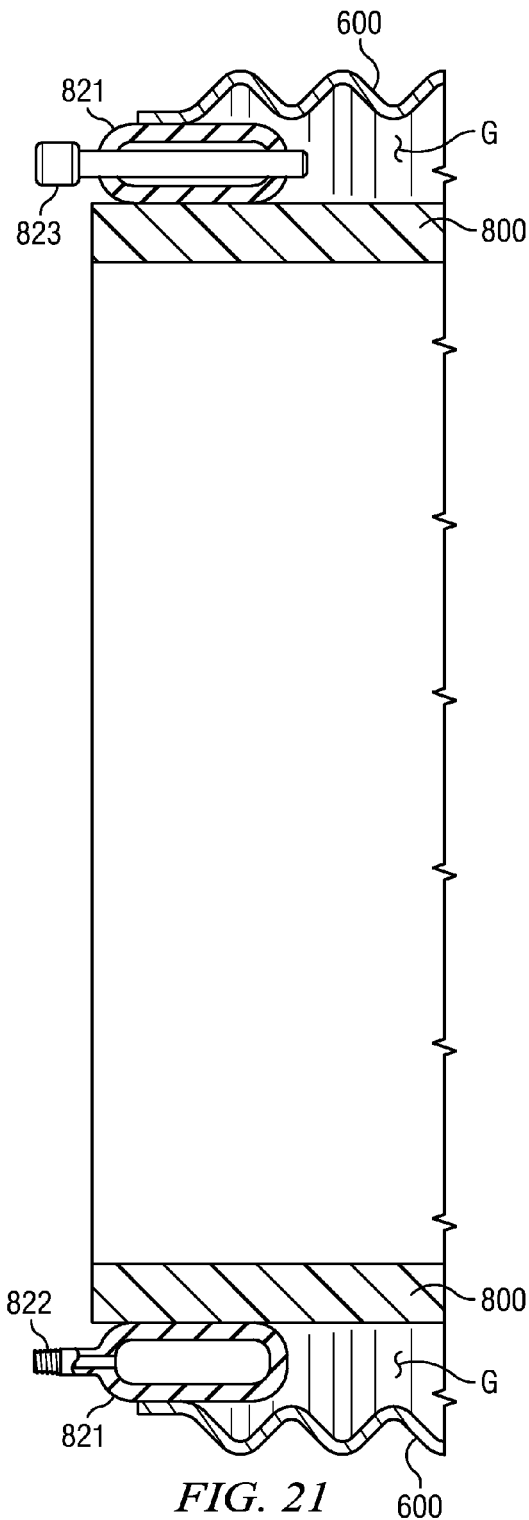

FIGS. 15, 16, 18A through 18G, 19 and 22 illustrate a "freeze frame" series of operations in accordance with a second embodiment of the disclosed technology (the "second refurbishment method" as described in the "Summary" section above). It will be recalled that the "second refurbishment method" expands the host pipe primarily by separating a longitudinal cut made along the length of the host pipe, (rather than by "smoothing out" the "waves" in the periphery of the host pipe per the "first refurbishment method"). FIGS. 17A through 17D illustrate features and aspects of one embodiment of expansion tool 700 that may be used generally for tubular expansion, including in association with either the "first refurbishment method" or the "second refurbishment method" also disclosed herein. FIGS. 20 and 21 illustrate features and aspects of inflatable bulkhead 820 that may be used generally for sealing annular spaces to be grouted, including in association with either the "first refurbishment method" or the "second refurbishment method" also disclosed herein.

For the purposes of the immediately following disclosure, FIGS. 15 through 22 should be viewed together. Any part, item, or feature that is identified by part number on one of FIGS. 15 through 22 has the same part number when illustrated on another of FIGS. 15 through 22.

Figure 15:
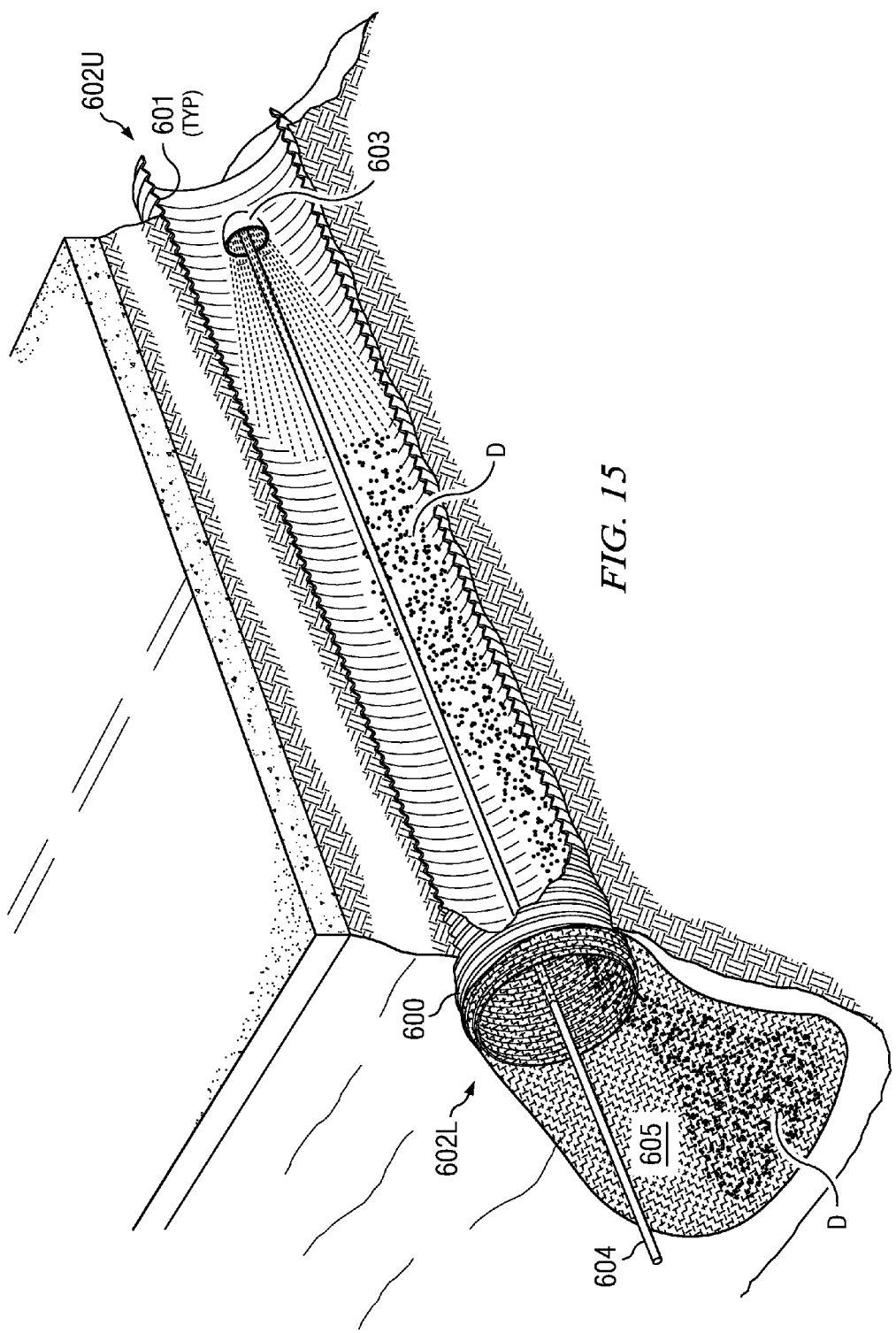

FIG. 15 illustrates a first stage of the second refurbishment method, in which existing host pipe 600 is to be refurbished. Similar to host pipe H on FIGS. 1 through 12, host pipe 600 on FIG. 15 is illustrated with corrugations 601. This is because buried host pipes requiring refurbishment, of which host pipe 600 on FIG. 15 is typical, are frequently corrugated pipes. However, it will be understood that corrugations 601 in host pipe 600 are ancillary to the second refurbishment method. As described in the "Summary" section above, the second refurbishment method is directed to plastic deformation of the host pipe via separation of a longitudinal cut, in contrast to the first refurbishment method, which is directed to plastic deformation of the host pipe via "smoothing out" of the waves in the corrugations.

Quite frequently, existing host pipe 600 will have a gradient or slope from one end to the other, to encourage surface runoff drainage through the host pipe from the surrounding terrain. This gradient is illustrated on FIG. 15 by host pipe 600 having upper end 602U and lower end 602L. It will be appreciated that in some situations, not illustrated, host pipe 600 may be level, in which case 602U and 602L would not apply. In such situations, the second refurbishment method described in this disclosure is the same, except that any of the associated disclosure discussing the effect of a host pipe gradient or slope does not apply.

On FIG. 15, host pipe 600 is being cleaned, and having internal debris D removed, before commencement of refurbishment operations. Optionally, the internal condition of host pipe 600 may also be memorialized immediately before and/or after cleaning. Such memorialization may be accomplished by convention image-capture technology such as video or still photography, and this disclosure is not limited in this regard.

The cleaning stage illustrated on FIG. 15 may be accomplished by any suitable conventional protocol. FIG. 15 illustrates one example of a suitable cleaning protocol. This disclosure is not limited to the cleaning protocol illustrated and described with reference to FIG. 15.

With further reference to FIG. 15, cleaning fluid spray head 603 is inserted into host pipe 600 from lower end 602L. Supply hose/handle 604 enables spray head 603 to be moved up and down the length of host pipe 600. In the embodiment illustrated on FIG. 15, spray head is directional, and shoots cleaning fluid back down the gradient to lower end 602L. Debris D from the cleaning process washes with the gradient down to lower end 602L, where it drains out of host pipe 600. A suitable container, such as net bag 605, catches the solids in debris D as they drain, enabling later offsite disposal of the solids. It will be appreciated that in the embodiment of FIG. 15, advantage may be taken of the gradient from upper end 602U to lower end 602L in order to assist cleaning and draining. This disclosure is not limited in this regard, however. Examples of cleaning fluids that may be dispensed by spray head 603 include steam or high pressure water. Alternatively, a solvent may be added.

Figure 16:
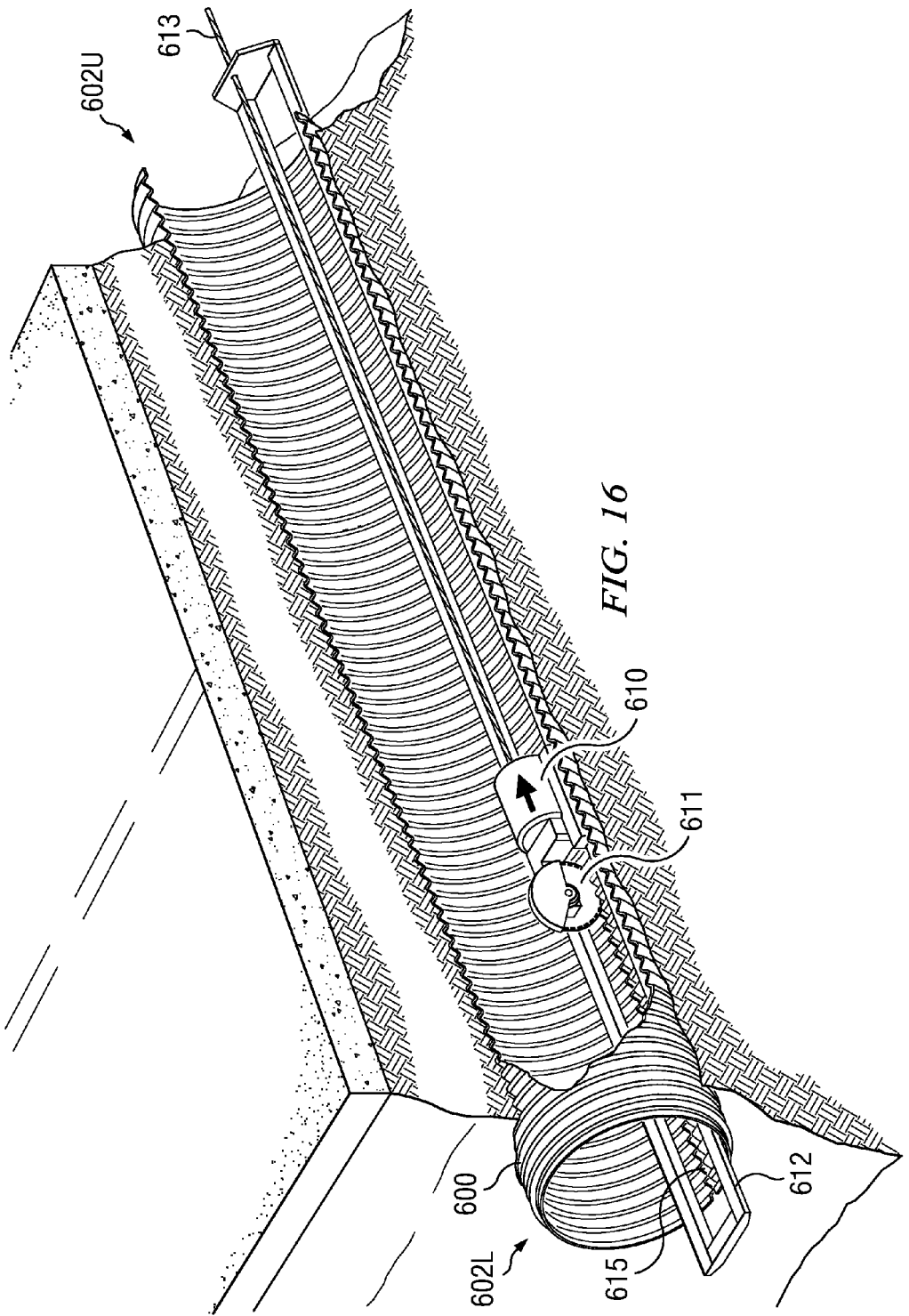

FIG. 16 illustrates the cutting stage of the second refurbishment method. A longitudinal cut 615 is made in host pipe 600 along the entire length of host pipe 600. Advantageously, longitudinal cut 615 is made in the bottom or "invert" (nadir) of host pipe 600, although this disclosure is not limited in this regard. The cutting stage illustrated on FIG. 16 may be accomplished by any suitable conventional protocol. FIG. 16 illustrates one example of a suitable cutting protocol. This disclosure is not limited to the cutting protocol illustrated and described with reference to FIG. 16.

In FIG. 16, and electrically-powered buggy 610 moves up the gradient in host pipe 600, from lower end 602L to upper end 602U, on track 612. Electric supply cables and/or pull cables 613 deliver power to buggy 610. Buggy 610 may be self-propelled on track 612, or may require to be pulled along track 612. Rotating circular saw 611 is attached to buggy 610, and is also powered electrically. Circular saw 611 is pre-set for parameters such as rotation speed, depth of cut, etc., in order to make a suitable longitudinal cut 615 in host pipe 600.

In the embodiment illustrated on FIG. 16, buggy 610 moves up the gradient from lower end 602L to upper end 602U, as shown by the arrow on buggy 610. Running the buggy uphill enables good control over the speed at which buggy 610 moves, so as to encourage a clean longitudinal cut 615. This disclosure is not limited, however, to direction of travel of buggy 610.

In other embodiments (not illustrated) buggy 610 may be self-propelled on large wheels (without a track), or via continuous self-propelled tracks (such as seen on bulldozers or military tanks). This disclosure is not limited to any particular type of propulsion of buggy 610, with or without track 612. In selecting a propulsion method for buggy 610, however, attention should be paid to the fact that buggy 610 may have a "bumpy ride" if it runs directly on corrugations 601 in host pipe 600. Such a "bumpy ride" may affect the quality of longitudinal cut 615.

FIGS. 18A through 18F are a series of "freeze frame" illustrations depicting the host pipe expansion stage of the second refurbishment method. The expansion stage of the second refurbishment method may be accomplished by any suitable conventional expansion protocol. FIGS. 18A through 18F illustrate one example of a suitable expansion protocol using a specially developed expansion tool, illustrated on FIGS. 17A through 17D, customized to provide suitable isolated outward radial force in the expansion stage. As noted in the disclosure above associated with FIGS. 1 and 2, isolated outward radial force is highly advantageous in the expansion stage in order to minimize buckling or accordion deformation of the host pipe. This disclosure is not limited, however, to the expansion protocol illustrated and described with reference to FIGS. 18A through 18F, deploying the expansion tool illustrated and described with reference to FIGS. 17A through 17D.

Earlier disclosure is worth repeating here to underscore the advantage of isolated outward radial force provided during expansion of host pipe 600 on FIGS. 18A through 18F. Such isolated outward radial force is in distinction to prior art tools and processes where dragging oversized conical or tapered tools through constricted host pipe openings caused bursting of the host pipes via a combination of longitudinal force and radial force. As noted in the "Summary" section above, bursting of the host pipe destroys the host pipe's ability to be part of the refurbishment, and requires the inner liner pipe to be brought in immediately behind the bursting tool in order to prevent collapse of the surrounding soil previously supported by the host pipe. Further the longitudinal forces created in pipe bursting can cause the host pipe to buckle, or to collapse into an accordion shape, creating severe operation difficulties for the refurbishment operation.

Looking first at FIGS. 17A through 17C, expansion tool 700 is a generally elongate, cylindrical assembly that displaces in three directions, indicated on FIG. 17A by arrows 701A, on FIG. 17B by arrow 701B and on FIG. 17C by arrows 701C. FIG. 17A depicts expansion tool 700 including a generally conical end assembly 720, in which two extendable stabilizers 725 reside. Actuation of stabilizers 725 causes them to extend in the direction of arrows 701A from a flush position (see FIG. 17C) to an extended position (see FIGS. 17A and 17B). The purpose of actuating stabilizers 725 is so that, when expansion tool 700 is within host pipe 600 (not shown on FIGS. 17A through 17C), stabilizers 725 may engage the interior wall of host pipe 600 and hold end assembly 720 rotationally immobile. When de-actuated, stabilizers 725 move in the opposite direction to arrows 701A on FIG. 17A, and return towards a flush position as illustrated on FIG. 17C.

Figure 17D:
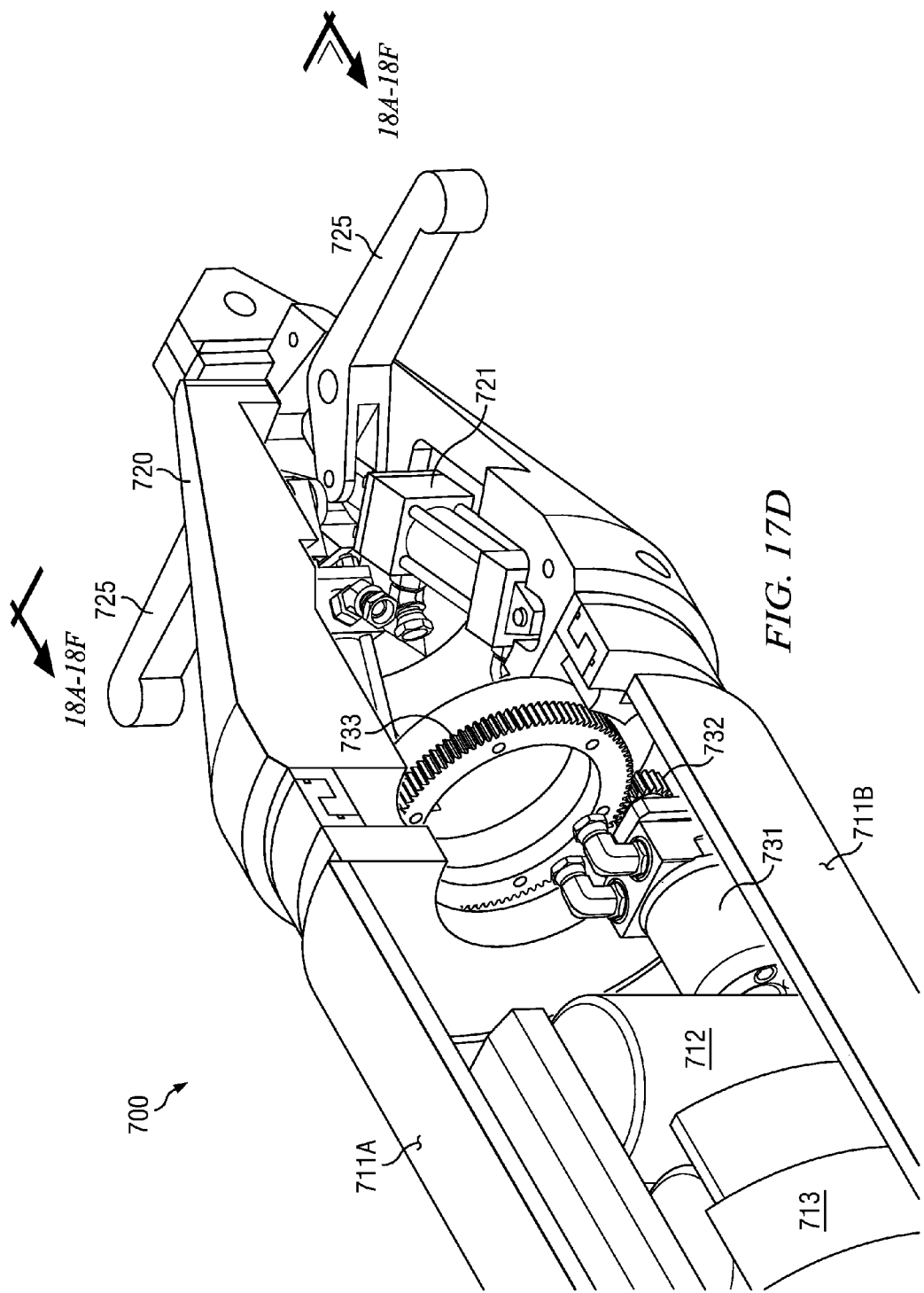

FIG. 17B depicts expansion tool 700 further including end assembly 720 rotationally connected to expansion assembly 710. As will be described below with reference to FIG. 17D, internal mechanisms in expansion tool 700 enable expansion assembly to make a controlled relative rotation with respect to end assembly 720, as indicated on FIG. 17B by arrow 701B. The controlled rotation is bi-directional, as selected by the operator (that is, in the direction of arrow 701B and in the opposite direction of arrow 701B).

FIG. 17C depicts expansion assembly 710 on expansion tool 700 further able to expand and retract. Upon actuation, floating radial force surface 711B separates from stationary radial force surface 711A in the direction of arrows 701C. FIG. 17C further depicts that such separation, upon actuation, is enabled by corresponding separation of a series of neighboring internal arcuate segments 713. When de-actuated, floating radial force surface 711B retracts towards stationary radial force surface 711A in the opposite direction of arrows 701C.

FIG. 17D depicts internal mechanisms in expansion tool 700 suitable to enable the features and displacements of expansion tool 700 that are illustrated and described immediately above with reference to FIGS. 17A through 17C. In the embodiment of FIG. 17D, all of the internal mechanisms are hydraulic, although this disclosure is not limited in this regard. Looking at FIG. 17D, and with momentary reference to FIG. 17A, extension and retraction of hydraulic pistons 721 in end assembly 720 enables corresponding extension and retraction of stabilizers 725 in the direction of arrows 701A (and in the reverse of arrows 701A). Note that the mass of end assembly 720 on FIG. 17D has hidden a second hydraulic piston 721 from view.

With continuing reference to FIG. 17D, and with momentary reference to FIG. 17B, actuation of hydraulic motor 731 causes rotation of pinion gear 732. It will be appreciated from FIG. 17D that hydraulic motor 731 and pinion gear 732 are connected to expansion assembly 710 on FIG. 17B. Pinion gear 732 on FIG. 17D engages with ring gear 733. FIG. 17D depicts ring gear 733 connected to end assembly 720. Thus, actuation of hydraulic motor 731 causes controlled relative rotation of end assembly 720 and expansion assembly 710, shown on FIG. 17B by arrow 701B (and in the reverse of arrow 701B).

With continuing reference to FIG. 17D, and with momentary reference to FIG. 17C, extension and retraction of hydraulic pistons 712 enables corresponding separation and retraction of arcuate segments 713, which in turn causes corresponding separation (expansion) and retraction of stationary radial force surface 711A and floating radial force surface 711B, as shown on FIG. 17C by arrows 701C (and in the reverse of arrows 701C). It will be noted in the embodiment of expansion tool 700 in FIGS. 17A through 17D, one radial force surface (711A) is stationary, while the other radial force surface (711B) is floating, i.e. extends and retracts. This disclosure is not limited in this regard, and suitable expansion tools in other embodiments may include opposing radial force surfaces that float in concert with each other.

Figure 18A:
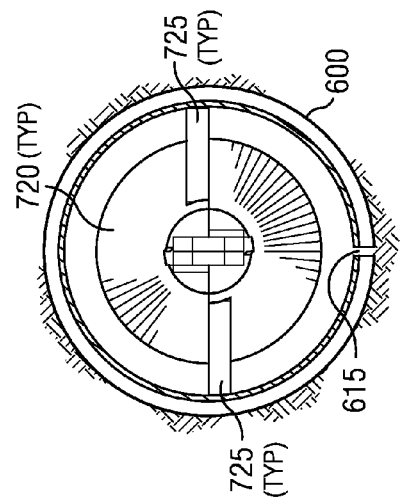

As noted above, FIGS. 18A through 18G are a series of "freeze frame" illustrations depicting the host pipe expansion stage of the second refurbishment method. The example of expansion tool 700 (as illustrated and described above with reference to FIGS. 17A through 17D) is used throughout FIGS. 18A through 18F to illustrate the second refurbishment method. FIGS. 18A through 18F are end elevation views as shown generally on FIG. 17D, showing expansion tool 700 in operation within host pipe 600. FIG. 18G depicts host pipe 600 after expansion operations on host pipe 600 are complete, with expansion tool 700 removed and inner liner pipe 800 inserted.

It will be understood that the expansion operations to be described immediately below with reference to FIGS. 18A through 18F are done over the length of host pipe 600 on a station-by-station basis. That is, the length of host pipe 600 is divided into a series of stations each approximately the longitudinal length of expansion assembly 710 as shown on FIG. 17B. In the expansion stage, expansion tool 700 moves along a path inside host pipe 600 stopping at each station to perform expansion operations, before moving on to the next station.

In FIG. 18A, at the first station, stabilizers 725 are extended from end assembly 720 to engage the interior wall of host pipe 600 and hold end assembly 720 rotationally immobile. Longitudinal cut 615 on FIG. 18A is substantially as created by circular saw 611 on FIG. 16.

Figure 18B:
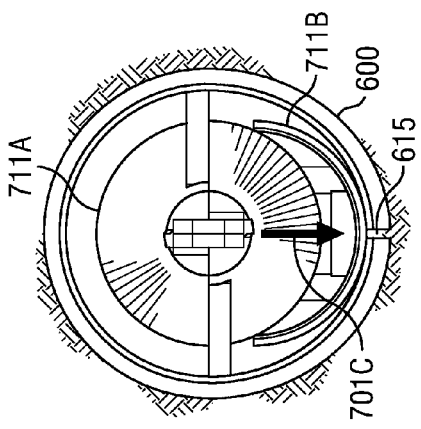
Figure 18C:
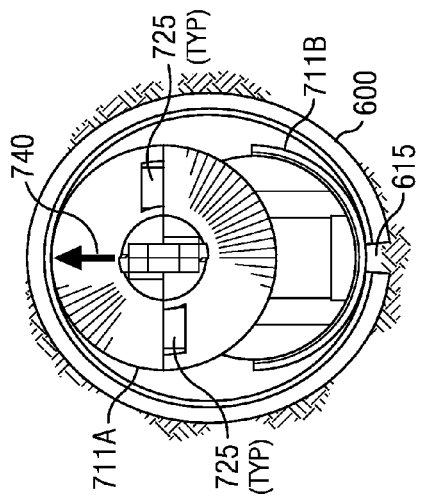

In FIG. 18B, floating radial force surface 711B separates from stationary radial force surface 711A, per arrow 701C, until floating radial force surface 711B engages a local section of the interior wall of host pipe 600. In FIG. 18C, continued actuation of expansion assembly 710 (refer FIG. 17B) causes stationary radial force surface 711A to move towards and engage a local section of the interior wall of host pipe 600 opposite floating radial force surface 711A, as indicated by arrow 740. Sometime between FIGS. 18B and 18C (advantageously when stationary and floating radial force sections 711A and 711B are both touching host pipe 600, but before deformation pressure is engaged), stabilizers 725 may be retracted, as shown on FIG. 18C. Alternatively (not illustrated), stabilizers 725 may remain extended and engaged on host pipe 600 during FIG. 18C. With continuing reference to FIG. 18C, continued separation of stationary and floating radial force surfaces 711A and 711B causes local plastic, non-destructive deformation of host pipe 600 at the local sections of the interior wall on which stationary and floating radial force surfaces 711A and 711B are engaged. More specifically, locally at stationary and floating radial force surfaces 711A and 711B, continued separation of stationary and floating radial force surfaces 711A and 711B increases the unobstructed interior diameter of host pipe 600 by a predetermined amount via non-destructive plastic separation of longitudinal cut 615.

Figure 18D:
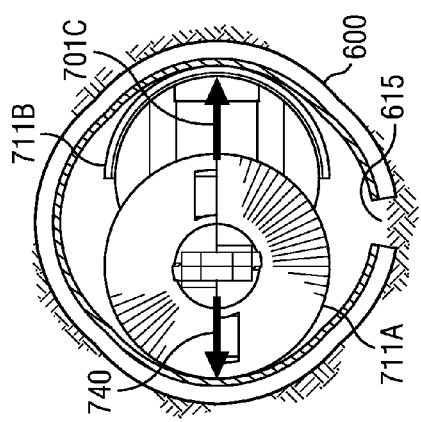

It will be understood that between FIGS. 18C and 18D, although not illustrated, stationary and floating radial force surfaces 711A and 711B are retracted, and if necessary (i.e. if previously retracted), stabilizers 725 are extended again to engage the interior wall of host pipe 600 and hold end assembly 720 rotationally immobile. Expansion assembly 710 (refer FIG. 17B) is then rotated a predetermined rotational displacement with respect to end assembly 720. Referring now to FIG. 18D, the operations described above with reference to FIG. 18C are repeated on a new local section of the interior wall of host pipe 600. Per FIG. 18D, continued separation of stationary and floating radial force surfaces 711A and 711B increases the unobstructed interior diameter of host pipe 600 at this new local interior wall section by a predetermined amount via non-destructive plastic separation of longitudinal cut 615.

Figure 18E:
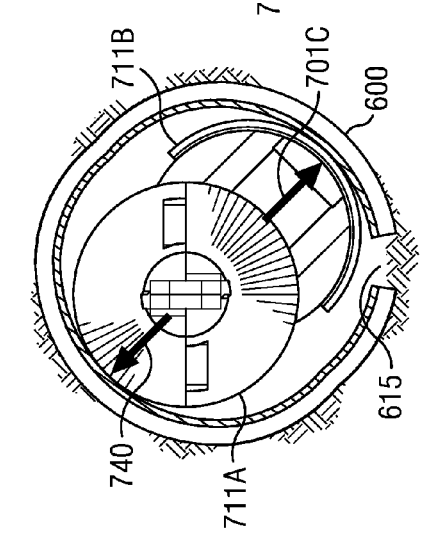

Moving on to FIG. 18E, it will be understood that between FIGS. 18D and 18E, again although not illustrated, expansion assembly 710 (refer FIG. 17B) is again rotated a predetermined rotational amount with respect to end assembly 720, per the steps described in the immediately preceding paragraph with reference to operations between FIGS. 18C and 18D. Referring now to FIG. 18E, the operations described above with reference to FIGS. 18C and 18D are repeated on a new local section of the interior wall of host pipe 600. Per FIG. 18E, continued separation of stationary and floating radial force surfaces 711A and 711B increases the unobstructed interior diameter of host pipe 600 at this new local interior wall section by a predetermined amount via non-destructive plastic separation of longitudinal cut 615.

Figure 18F:
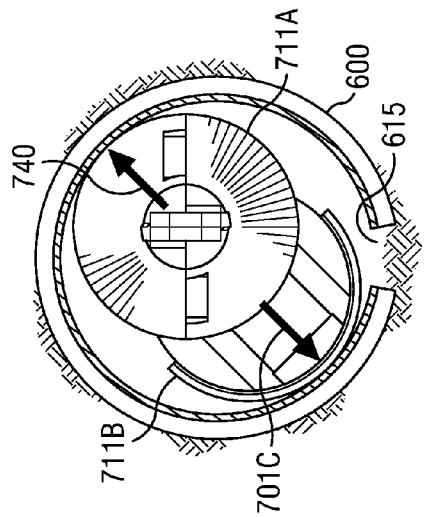

Moving on to FIG. 18F, it will be understood that between FIGS. 18E and 18F, again although not illustrated, expansion assembly 710 (refer FIG. 17B) is again rotated a predetermined rotational amount with respect to end assembly 720, per the steps described in the immediately preceding paragraph with reference to operations between FIGS. 18D and 18E. Referring now to FIG. 18F, the operations described above with reference to FIGS. 18C, 18D and 18E are repeated on a new local section of the interior wall of host pipe 600. Per FIG. 18F, continued separation of stationary and floating radial force surfaces 711A and 711B increases the unobstructed interior diameter of host pipe 600 at this new local interior wall section by a predetermined amount via non-destructive plastic separation of longitudinal cut 615.

The operations described above with reference to FIGS. 18A through 18F are repeated until the unobstructed interior diameter of host pipe 600 is increased overall, at the first station, a desired amount via non-destructive plastic separation of longitudinal cut 615. Expansion tool is moved on to the second and subsequent stations, and expansion operations as described above with reference to FIGS. 18A through 18F are repeated at each station until the unobstructed interior diameter of host pipe 600 is increased overall, at the second and subsequent stations, a desired amount via non-destructive plastic separation of longitudinal cut 615. Eventually, the unobstructed interior diameter of host pipe 600 is increased overall, over its entire length, a desired amount via non-destructive plastic separation of longitudinal cut 615.

At this point, the expansion stage of the second refurbishment method is complete. Expansion tool 700 is withdrawn, and a new inner liner pipe 800 is inserted inside the expanded host pipe 600. FIG. 18G shows, in cross-section, host pipe 600 expanded per expansion operations described above with reference to FIGS. 18A through 18F, with liner pipe 800 inserted inside. Liner pipe 800 may be inserted inside host pipe 600 by any suitable method, and preferably by sliplining as described above with reference to FIGS. 11 and 13. In currently preferred embodiments, liner pipe 800 has a smooth profile on both inner and outer surfaces, although this disclosure is not limited in this regard. Other embodiments may deploy a corrugated liner pipe 800 to give liner pipe additional intrinsic strength. Different deployments may call for a balance between liner pipe strength for a given diameter or weight, versus the coefficient of friction generated when inserting the liner pipe into the host pipe. Liner pipe 800 may typically be made of a light weight, hard wearing material, such as 16 to 20 gauge steel, or PVC, or a fiber-resin composite. It will be nonetheless appreciated that this disclosure is not limited to any specific material for liner pipe 800.

It will be further appreciated from FIG. 18G that, with host pipe 600 now in an expanded state, the outside diameter and wall thickness of liner pipe 800 may be selected to provide an inner diameter of liner pipe 800 that is comparable to the effective operating diameter of host pipe 600 before expansion. By "comparable", the inner diameter of liner pipe 800 may be selected to be at least as large as the effective operating diameter of host pipe 600 before expansion, if not larger. As noted in the "Summary" section of this disclosure above, this aspect of disclosure may be particularly advantageous in applications where the capacity of flow capability of host pipe 600 is desired to be maintained or even improved after refurbishment.

Purely by way of example, and not limiting this disclosure in any way, many existing host pipes needing refurbishment are in a range of unexpanded diameters of between 18" and 24". Current embodiments of expansion tools consistent with this disclosure are 16"-22" in unexpanded diameter and are configured to generate up to 5" of local expansion. This allows inner liner pipes of 0.5"-1" wall thickness to be easily inserted into expanded host pipes and retain/replicate the original unobstructed diameter of the host pipe.

Further, as noted in the "Summary" section of this disclosure above, the introduction of liner pipe 800 only after host pipe 600 has been completely expanded greatly enhances the probability of the success of the job. This is in contrast to prior art processes where the inner liner pipe has to follow right after a host pipe bursting tool in order to avoid collapse of the surrounding soil into the host pipe void. Further, the introduction of liner pipe 800 only after host pipe 600 has been completely expanded allows the annular space between liner pipe 800 and host pipe 600 to be grouted.

Figure 22:
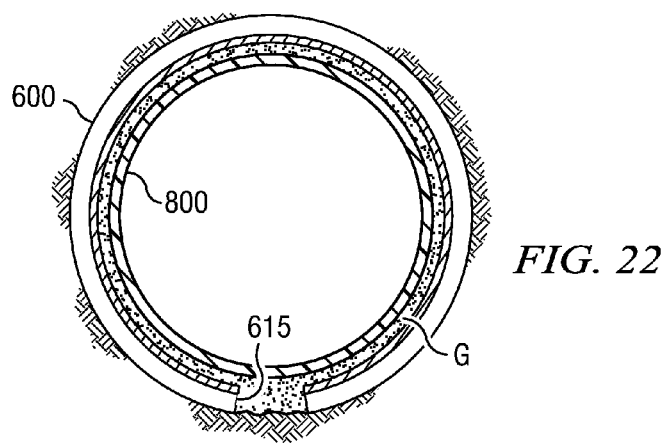

The grouting stage of the second refurbishment method is illustrated on FIGS. 19 and 22. The grouting stage illustrated on FIGS. 19 and 22 may be accomplished by any suitable conventional protocol. FIGS. 19 and 22 illustrate one example of a suitable grouting protocol using specially developed inflatable bulkheads 820, illustrated on FIGS. 20 and 21, customized to dispense liquid grout in the annular space between liner pipe 800 and host pipe 600, and retain the grout while it cures. This disclosure is not limited, however, to the grout protocol illustrated and described with reference to FIGS. 19 and 22, deploying the inflatable bulkheads illustrated and described with reference to FIGS. 20 and 21.

FIG. 20 depicts inflatable bulkhead 820 comprising inflatable ring 821 supplied (inflated) via inflation valve 822. Inflatable ring 821 may be made from conventional inflatable materials, such as rubber or rubber composites, and inflation valve 822 is conventional. Inflatable bulkhead 820 also includes at least one (on FIG. 20, three) grout fittings 823. Grout fittings 823 pass through inflatable ring 821 and are conventionally sealed at their points of insertion through the wall of inflatable ring 821. Grout fittings 823 are adapted to allow liquid grout to pass through. They may be made of any conventional material such as brass, stainless steel, etc. Each grout fitting 823 has a connector on one end suitable for connection with a conventional liquid grout hose.

FIG. 19 depicts grout G being injected into the annular space between liner pipe 800 and host pipe 600. Preferably the annular space is completely filled with grout G. However, in some embodiments the annular space is at least partially filled with grout G. Inflatable bulkheads 820 are installed over either end of liner pipe 800, and under host pipe 600, and thereby seal the annular space at either end. Since inflatable bulkheads 820 are advantageously made of rubber (or a rubber-like material) and are inflatable, the same bulkhead may be used for several combinations of outside diameters of liner pipe 800 and corresponding expanded internal diameters of host pipe 600. For the same reason, inflatable bulkheads 820 provide good seals of the annular space at either end of liner pipe 800 and host pipe 600 regardless of surface or shape irregularities at the points of contact with inflatable bulkheads 820. Consistent with the disclosure immediately above with reference to FIG. 20, liquid grout G is injected into the annular space on FIG. 19 through one inflatable bulkhead 820 via grout fittings 823. Inflatable bulkheads 820 retain grout G in the annular space while it cures. Once grout G is cured, inflatable bulkheads 820 may be deflated and removed. At this point, refurbishment of host pipe 600 according to the second refurbishment method is substantially complete, and the refurbished assembly has a cross-section as shown on FIG. 22.

It will be appreciated from FIG. 19 that liquid grout G may be injected into the annular space between liner pipe 800 and host pipe 600 from either or both ends. If only injected from one end, the inflatable bulkhead 820 at the non-injection end may be a plain bulkhead without grout fittings 823, or else the grout fittings 823 at the non-injection end may be temporarily plugged.

FIG. 21 is a cross-section as shown on FIG. 19, and shows the operational interface between inflatable bulkhead 820 and liner pipe 800/host pipe 600 in more detail. Inflatable ring 821 is installed between liner pipe 800 and host pipe 600 and inflated via inflation valve 822. Grout fitting(s) 823 dispense grout G into the annular space between liner pipe 800 and host pipe 600.

Although not specifically illustrated on FIGS. 19 through 21, it may be advantageous to stabilize liner pipe 800 during grouting operations. It will be recalled from disclosure above of the first refurbishment method that stabilization of the liner pipe (via, e.g., filling with water or pressurizing with air) during grouting operations was advantageous while the grout cured, in order to prevent possible deformation or even collapse of the liner pipe under the weight or pressure of the liquid grout. See "Summary" section above and discussion of block 406 on FIG. 13. The foregoing discussion of liner pipe stabilization during grouting operations applies equally to the second refurbishment method, and where applicable, the prior disclosure above is incorporated here by reference. As noted, while optional, liner pipe stabilization may be advantageous in some deployments.

Figure 23:
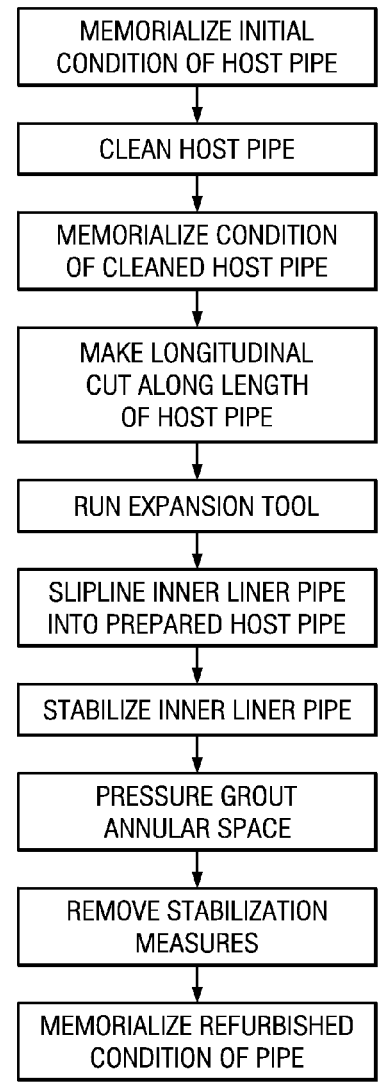
FIG. 23 is a flow chart illustrating a second embodiment of a method of refurbishing an underground pipe in accordance with the disclosed technology (the "second refurbishment method" as described in the "Summary" section above).

FIG. 23 is a flow chart describing aspects of the second refurbishment method, summarizing much of the foregoing disclosure with reference to FIGS. 15 through 22. Many of the blocks on FIG. 23 are similar to or the same as corresponding labels on FIGS. 13 and 14. The corresponding discussion above of FIGS. 13 and 14, where applicable, applies to FIG. 23 and is incorporated here by reference. Where FIG. 23 differs from FIG. 13 or 14, the discussion above with reference to FIGS. 15 to 22 applies.

Although the inventive material in this disclosure has been described in detail along with some of its technical advantages, it will be understood that various changes, substitutions and alternations may be made to the detailed embodiments without departing from the broader spirit and scope of such inventive material.

I claim:

1. A method for refurbishing an existing pipe, the method comprising the steps of, in sequence:
   (a) providing an existing host pipe, the host pipe having a length, the host pipe further having an interior wall with a known unobstructed internal diameter;
   (b) making a longitudinal cut through the interior wall along the length of the host pipe;
   (c) providing an expansion tool having expansion and retraction modes, the expansion tool adapted to generate isolated outward radial force when in expansion mode;

(d) moving the expansion tool along a path inside the host pipe, the path having stations at which the expansion tool stops;
(e) expanding the host pipe during step (d), step (e) further including, at each station:
  (e1) stopping the expansion tool;
  (e2) placing the expansion tool in expansion mode;
  (e3) engaging the interior wall of the host pipe with the expansion tool while in expansion mode;
  (e4) responsive to isolated outward radial force from the expansion tool, increasing the unobstructed interior diameter of the host pipe a predetermined amount via non-destructive plastic separation of the longitudinal cut through the interior wall;
  (e5) switching the expansion tool to retraction mode; and
  (e6) moving the expansion tool to the next station;
(f) withdrawing the expansion tool from the host pipe;
(g) inserting a rigid liner pipe inside the host pipe, the liner pipe having a rigid tubular profile prior to insertion and deployed to operationally replace the host pipe, an annular space created between the liner pipe and host pipe when the liner pipe is inserted inside the host pipe; and
(h) at least partially filling the annular space with grout.

2. The method of claim 1, in which step (g) is begun after steps (e) and (f) are complete.

3. The method of claim 1, further comprising, between steps (a) and (b), the step of:
  (a1) cleaning the host pipe and removing interior debris therefrom.

4. The method of claim 3, further comprising the step of capturing an image of an internal condition of the host pipe immediately after step (a1).

5. The method of claim 1, further comprising the steps of capturing an image of an initial internal condition of the host pipe before step (a) and capturing an image of a final internal condition of the host pipe after step (h).

6. The method of claim 1, further comprising the steps of stabilizing the liner pipe with stabilization measures before step (h) and removing the stabilization measures after step (h).

7. A method for refurbishing an existing pipe, the method comprising the steps of, in sequence:
  (a) providing an existing host pipe, the host pipe having a length, the host pipe further having an interior wall with a known unobstructed internal diameter;
  (b) making a longitudinal cut through the interior wall along the length of the host pipe;
  (c) providing a generally elongate cylindrical expansion tool, the expansion tool having an end assembly rotatably connected to an expansion assembly, the end assembly including at least two extendable radial stabilizers, the expansion assembly including a stationary radial force surface generally opposed to a floating radial force surface, the expansion assembly adapted to generate isolated outward radial force when actuated by displacing the floating radial force surface away from the stationary radial force surface;
  (d) moving the expansion tool along a path inside the host pipe, the path having stations at which the expansion tool stops;
  (e) expanding the host pipe during step (d), step (e) further including, at each station:
    (e1) stopping the expansion tool;
    (e2) extending the radial stabilizers to engage the interior wall of the host pipe and hold the end assembly rotationally immobile;
    (e3) actuating the expansion assembly until the stationary radial force surface and the floating radial force surface exert isolated outward radial force on opposing portions of the interior wall of the host pipe;
    (e4) responsive to step (e3), and locally at the stationary radial force surface and the floating radial force surface, increasing the unobstructed interior diameter of the host pipe a first predetermined amount via non-destructive plastic separation of the longitudinal cut through the interior wall;
    (e5) de-actuating the expansion assembly until at least one of the stationary radial force surface and the floating radial force surface disengages from the interior wall;
    (e6) rotating the expansion assembly a predetermined rotational displacement with respect to the end assembly;
    (e7) repeating steps (e3) through (e6) until the unobstructed interior diameter of the host pipe is increased overall at least a second predetermined amount via non-destructive plastic separation of the longitudinal cut through the interior wall;
    (e8) retracting the radial stabilizers until at least one of the radial stabilizers disengages from the interior wall of the host pipe; and
    (e9) moving the expansion tool to the next station;
  (f) withdrawing the expansion tool from the host pipe;
  (g) inserting a rigid liner pipe inside the host pipe, the liner pipe having a rigid tubular profile prior to insertion and deployed to operationally replace the host pipe, an annular space created between the liner pipe and host pipe when the liner pipe is inserted inside the host pipe; and
  (h) at least partially filling the annular space with grout.

8. The method of claim 7, in which step (g) is begun after steps (e) and (f) are complete.

9. The method of claim 7, further comprising, between steps (a) and (b), the step of:
  (a1) cleaning the host pipe and removing interior debris therefrom.

10. The method of claim 9, further comprising the step of capturing an image of an internal condition of the host pipe immediately after step (a1).

11. The method of claim 7, further comprising the steps of capturing an image of an initial internal condition of the host pipe before step (a) and capturing an image of a final internal condition of the host pipe after step (h).

12. The method of claim 7, in which step (e3) further comprises:
  (e3.1) actuating the expansion assembly until the stationary radial force surface and the floating radial force surface both engage the interior wall of the host pipe;
  (e3.2) retracting the radial stabilizers so that at least one radial stabilizer disengages from the interior wall of the host pipe; and
  (e3.4) further actuating the expansion assembly to exert isolated outward radial force on opposing portions of the interior wall of the host pipe; and
in which step (e) further comprises, between steps (e5) and (e6), the step of:
  (e5.1) extending the radial stabilizers to engage the interior wall if the host pipe and hold the end assembly rotationally immobile.

13. The method of claim 7, further comprising the steps of stabilizing the liner pipe with stabilization measures before step (h) and removing the stabilization measures after step (h).

* * * * *